(12) United States Patent
Sa

(10) Patent No.: US 10,887,165 B2
(45) Date of Patent: Jan. 5, 2021

(54) PERSONAL WORKING SYSTEM AVAILABLE FOR DYNAMIC COMBINATION AND ADJUSTMENT

(71) Applicants: Zhenhua Li, Shanghai (CN); Shuang Sa, Richmond (CA)

(72) Inventor: Shuang Sa, Richmond (CA)

(73) Assignees: Zhenhua Li, Shanghai (CN); Shuang Sa, Richmond (CA)

( * ) Notice: Subject to any disclaimer, the term of this patent is extended or adjusted under 35 U.S.C. 154(b) by 56 days.

(21) Appl. No.: 15/113,668

(22) PCT Filed: Jan. 21, 2015

(86) PCT No.: PCT/CN2015/071262
§ 371 (c)(1),
(2) Date: Jul. 22, 2016

(87) PCT Pub. No.: WO2015/110022
PCT Pub. Date: Jul. 30, 2015

(65) Prior Publication Data
US 2017/0012821 A1    Jan. 12, 2017

(30) Foreign Application Priority Data

Jan. 22, 2014 (CN) .......................... 2014 1 0029546

(51) Int. Cl.
*H04L 12/24* (2006.01)
*G06F 1/16* (2006.01)
(Continued)

(52) U.S. Cl.
CPC ........ *H04L 41/0816* (2013.01); *G06F 1/1632* (2013.01); *G06F 3/14* (2013.01);
(Continued)

(58) Field of Classification Search
None
See application file for complete search history.

(56) References Cited

U.S. PATENT DOCUMENTS 6,466,982 B1 * 10/2002 Ruberg ..................... G06F 9/52
  709/227
6,489,932 B1 * 12/2002 Chitturi ................ G06F 1/1601
  345/173
(Continued)

FOREIGN PATENT DOCUMENTS

CN          1759386 A      4/2006
CN        102523665 A      6/2012
(Continued)

OTHER PUBLICATIONS

Extended European Search Report dated Sep. 29, 2017 in corresponding European Application No. 15740525.9; 10 pgs.
(Continued)

*Primary Examiner* — Robert C Scheibel
(74) *Attorney, Agent, or Firm* — Maier & Maier, PLLC

(57) ABSTRACT

The present invention discloses a personal working system with a dynamic structure, including a central control unit, wherein the central control unit includes an external device identification component used for identifying a plurality of external devices and connecting the identified plurality of external devices into a working system; a weak (or short-distance) communication interface for the communication between the central control unit and the external devices; a strong (or medium-distance and long-distance) communication interface for the communication between the central control unit and an external node; the weak communication interface includes Bluetooth; and the strong communication interface includes WIFI connection, Internet connection, local area network connection and radio telephone connection. The present invention has the advantages that the (Continued)

external devices will not be outdate and is universal with the external devices of the system in the world.

7 Claims, 22 Drawing Sheets

(51) Int. Cl.
| | | |
|---|---|---|
| *H04W 24/04* | (2009.01) | |
| *H04W 4/80* | (2018.01) | |
| *G06F 3/14* | (2006.01) | |
| *G06F 13/14* | (2006.01) | |
| *H04N 7/14* | (2006.01) | |
| *H04W 84/12* | (2009.01) | |

(52) U.S. Cl.
CPC .............. *G06F 13/14* (2013.01); *H04W 4/80* (2018.02); *H04W 24/04* (2013.01); *G09G 2358/00* (2013.01); *G09G 2370/022* (2013.01); *G09G 2370/025* (2013.01); *G09G 2370/042* (2013.01); *G09G 2370/16* (2013.01); *H04N 7/141* (2013.01); *H04W 84/12* (2013.01)

(56) References Cited

U.S. PATENT DOCUMENTS

| | | | | |
|---|---|---|---|---|
| 7,383,061 | B1* | 6/2008 | Hawkins | G06F 1/1632 345/169 |
| 9,811,116 | B2* | 11/2017 | Huang | G06F 1/1632 |
| 2002/0101706 | A1* | 8/2002 | Shin | G06F 1/1607 361/679.27 |
| 2002/0109665 | A1* | 8/2002 | Matthews | G06F 1/1601 345/156 |
| 2004/0003073 | A1 | 1/2004 | Krzyzanowski et al. | |
| 2004/0098458 | A1* | 5/2004 | Husain | H04L 41/0803 709/204 |
| 2004/0233930 | A1* | 11/2004 | Colby, Jr. | G06F 1/1632 370/464 |
| 2005/0243021 | A1* | 11/2005 | Perez | G06F 1/1613 345/1.3 |
| 2008/0195788 | A1* | 8/2008 | Tamir | G06F 1/1632 710/303 |
| 2009/0086735 | A1* | 4/2009 | Tsang | H04L 1/1874 370/394 |
| 2012/0087078 | A1* | 4/2012 | Medica | G06F 1/1632 361/679.31 |
| 2013/0080670 | A1* | 3/2013 | Medica | G06F 1/1626 710/110 |
| 2013/0091311 | A1 | 4/2013 | Caballero | |
| 2013/0165216 | A1* | 6/2013 | Rasmussen | G07F 17/3218 463/25 |
| 2013/0324035 | A1* | 12/2013 | Strommen | G06F 3/01 455/41.1 |
| 2014/0013014 | A1* | 1/2014 | Huang | G06F 1/1632 710/19 |
| 2014/0059264 | A1* | 2/2014 | Sudak | H04W 4/008 710/303 |
| 2014/0152235 | A1* | 6/2014 | Huang | G06F 1/1632 320/107 |
| 2014/0351479 | A1* | 11/2014 | Lee | H04W 76/14 710/303 |
| 2015/0205747 | A1* | 7/2015 | Dees | H04M 1/7253 710/303 |
| 2016/0323456 | A1* | 11/2016 | Bernsen | G06F 1/1632 |
| 2016/0334837 | A1* | 11/2016 | Dees | H04L 67/16 |

FOREIGN PATENT DOCUMENTS

| | | |
|---|---|---|
| JP | 2008-227701 A | 9/2008 |
| WO | 2006/075588 A1 | 7/2006 |

OTHER PUBLICATIONS

International Search Report dated Apr. 9, 2015 in corresponding Application No. PCT/CN2015/071262; 2 pgs.
Office Action dated Feb. 19, 2019 in corresponding Japanese Application No. 2016-565537; 9 pages including English-language translation.
Office Action dated Jan. 24, 2019 in corresponding European Application No. 15 740 525.9; 5 pages.

\* cited by examiner

| Central Processor ID | External Device Group ID | External Device ID | Use State |
|---|---|---|---|
| Center ID1 | External Device Group ID1 | External Device ID11 | Idle/Working/Lock |
| | | External Device ID12 | |
| | | External Device ID13 | |
| | | ...... | |
| | | External Device ID1k | |
| Center ID2 | External Device Group ID2 | External Device ID21 | Idle/Working/Lock |
| | | External Device ID22 | |
| | | External Device ID23 | |
| | | ...... | |
| | | External Device ID2n | |
| ...... | ...... | ...... | Idle/Working/Lock |
| Center IDn | External Device Group IDN | External Device IDNn | Idle/Working/Lock |

Fig. 2C

| External Device Processing Unit ID | External Device ID/ External Device Group ID | Request Content | Operating State |
|---|---|---|---|
| External Device Processing Unit 1 | External Device ID1/ External Device Group ID1 | | Refusing/Waiting/Completing |
| External Device Processing Unit 2 | External Device ID2/ External Device Group ID2 | | Refusing/Waiting/Completing |
| External Device Processing Unit 3 | External Device ID3/ External Device Group ID3 | | Refusing/Waiting/Completing |
| ...... | ...... | | Refusing/Waiting/Completing |
| External Device Processing Unit n | External Device IDn/ External Device Group IDn | | Refusing/Waiting/Completing |

Fig. 2D

Common Components are Extracted to be Integrated into an Entirety "Personal Control Center"

A Variety of Individualized "Application External Devices" Can Operate in a One-Pairing-Many Way and Select the Components According to Demand

| | Smartphone | Tablet PC | Laptop | Reader | Player | GPS | Smartwatch | Medical Monitoring |
|---|---|---|---|---|---|---|---|---|
| Sensor | | | | | | | X | X |
| Microphone | X | X | X | | | | X | |
| Earphone | X | X | X | X | X | X | X | X |
| Photographic Lens | X | X | X | | | | | |
| Joystick | | | X | X | | | | |
| Mouse | | | X | X | | | | |
| Keyboard | | | X | | | | X | X |
| Touch Display Screen | Screens In Different Sizes Are The Main Option And Main Difference | | | | | | | |
| Handset Interface | X | X | X | X | X | X | X | X |
| USB Interface | X | X | X | X | X | X | X | X |
| Big Battery | X | X | X | X | X | X | X | X |
| GPS | X | X | | | | X | X | |
| Bluetooth | X | X | X | | | X | X | X |
| 3G Network Card | X | X | X | | | | | |
| WALN Net | X | X | X | X | | | X | X |
| Start Key | X | X | X | X | X | X | X | X |
| Image Memory | X | X | X | X | X | X | X | X |
| Image Processor | X | X | X | X | X | X | X | X |
| Hard Disk | X | X | X | X | X | X | X | X |
| Memory | X | X | X | X | X | X | X | X |
| Mainboard | X | X | X | X | X | X | X | X |
| Central Processor | X | X | X | X | X | X | X | X |
| Operating System | X | X | X | X | X | X | X | X |

Fig. 27

PERSONAL WORKING SYSTEM AVAILABLE FOR DYNAMIC COMBINATION AND ADJUSTMENT

BACKGROUND OF THE INVENTION

With the increasing development of electronic technology and communication technology, personal audio-visual and personal communication devices become more and more prevalent, and in order to meet the requirements of consumers on different functions, screen sizes, carrying convenience degrees, input manners, battery lives and the like, a variety of electronic communication and working devices have emerged one after another on the market, such as smart phones, portable audio-visual devices, tablet computers, readers, navigators, smart watches, intelligent body builders, personal healthcare detection devices, etc.

In order to meet the requirements of consumers on different special functions, screen sizes, carrying convenience degrees, input manners, battery lives and the like, manufacturers have to launch a variety of matched and combined electronic devices based on the technical level at that time and software and hardware with substantially the same core structure, for example, different models of tablet phones, in which only the screen sizes are different and the mainboards and other configurations are substantially the same.

Consumers are forced to make more choices for various demands (for example, query and communication when taking bus, watching movies, text processing, drawing, convenient carrying, surfing the internet and guiding) and even merely periodic (or temporary) demands. The numerous choices are actually similar circuits and operating structures. For example, the inventor has analyzed some devices on the market (including smart phones, portable audio-visual players, tablet computers, readers, navigators, smart watches, intelligent body builders and personal healthcare detection devices) and found that most structures are similar (as shown in the analysis in FIG. 12).

Multiple functions of the existing electronic communication devices are typically integrated within a space as small as possible, thereby bearing high production costs caused by the integration and bringing such problems to the products as difficulty in heat dissipation, high update and upgrade costs and the like; even some important functions and features have to be sacrificed and given up to satisfy the lightweight requirements of the products. Due to different demands, consumers have to repeatedly spend money in buying identical products, bearing the dilemma of converting data back and forth, storing address books here and there and repeatedly synchronizing, and having to buy the entire device at high price due to the demand for a certain performance.

The existing devices have the following defects:
1. Repeated Waste and Upgrade Difficulty of Structures:
Taking a mobile electronic information processing device as an example, on the current market, each mobile electronic information processing device basically has some identical device configurations (such as CPU+GPU+ROM+RAM+microphone+telephone receiver+camera+gravity sensor+Bluetooth+wireless connection (WiFi)+screen+touch screen and other components), that is to say, you spend more than half of money on redundant components beginning from the moment when you own your second mobile electronic device; moreover every time the requirements on a certain function change, even if only a very simple part, the consumers may need to completely replace the entire device, and with the advent of new external devices, upgrade and update on the external devices were not possible.

2. Poor Adaptability of Curing Structure:
The adaptability of the curing structure in the existing personal working systems is poor. Taking a PAD processing device as an example, in a currently popular Apple IPAD tablet computer, the CPU+GPU+ROM+RAM+microphone+telephone receiver+camera+gravity sensor+Bluetooth+wireless connection (WiFi)+screen+touch screen are integrated together, regardless in a quiet office, on a crowded bus, or in a spacious living room, a user has no choice but to look at the screen of the same size and listens to the sound with the same effect, in this way, the portable, smart devices with the same size cannot be randomly combined, for example, not using screens with different sizes in different occasions.

SUMMARY OF THE INVENTION

The present invention relates to a brand-new working system and particularly relates to a dynamic structure and method for forming a personal working system.

The principle is to carry out functional separation on an existing device with a solid state structure to construct an information collecting and processing system and a communication switching system of a control center main body and a plurality of functional units, which are dynamically connected.

The communication information working system provided by the present invention is a dynamic communication working system, which is composed of one or more central processing units and one or more external devices (or external device units) and can achieve a series of functions and complete a series of tasks. Wherein, the central processing unit has a centralized data processing function, the external device (or the external device unit) executes a specific function, the one or more external devices (or external device units) can perform mutual recognition with the central processing unit to establish a link to exchange data, can receive various data (or various processed data), instructions or commands of the central processing unit and execute or process the various data (or various processed data), instructions or commands transmitted by the central processing unit.

The link established by the mutual recognition of the one or more external devices with the central processing unit can be a link limited by distance and even exclusive; some special or confidential external devices should also be exclusive and disconnect and remove the function requirements of previous link information. Before the communication working system is formed, the central processing unit and the external device cannot singly complete a certain series of tasks, but one central processing unit must be paired with one or more external devices to form the working system to complete the series of tasks together.

According to the personal working system provided by the present invention, a part of background functions of the existing electronic device can be integrated and centralized on a "central processing unit", or the background functions are selectively integrated and centralized on a "external device processing unit" to be dynamically shared by a variety of external devices; meanwhile, aiming at the individuation of different individual demands of device users (consumers), a variety of external devices of the personal working system are more professional and simplified. The "central processing unit" and the "external devices" form a set of portable personal communication information processing system available for dynamic combination and adjustment. The external devices can be randomly and freely matched, are free of outdating and are universal in the world. The user can walk around the world with the personal "central processing unit" and can arbitrarily use external application devices.

According to the present invention, the user invests once to buy a "central processing unit" and randomly matches "external devices" according to any change in personal preference, and the user can randomly combine and use the "external devices", as long as he can obtain or get close to the "external devices" or get close to the external device processing unit (or external device processing service center) for managing the "external devices". For example, the user can have a variety of external devices, such as a "watch external device", a "spectacle frame external device", a "mobile phone external device", a "desk desktop external device", a "vehicle-mounted external device", a "living room TV", "bedroom projection", etc. Each external device abandons the complicated and expensive internal structure and becomes the simplest and the most simplified device, and they share the same "central processing unit" provided with an integrated computing center or are shared by different "central processing units". The user can save a considerable portion of the manufacturing cost of each mobile device. The "central processing unit" and the "external devices" can be updated and upgraded more conveniently with less costs. That says, after the computing centers are centralized and integrated, the user may use the same cost to obtain a "central processing unit" with a double speed and a double internal memory, and the same type of external devices can also be configured according to different conditions, for example, an "external device" with a larger screen is configured at home and an "external device" with a smaller screen is configured during travelling.

Compared with a traditional portable tablet computer, the functional components of the "central processing unit" in the present invention, such as a screen, a touch screen, a keyboard, a mouse, a microphone receiver, a loudspeaker, a camera, a gravity sensing device and the like, are eliminated, so that the volume of the mainframe is greatly reduced; the eliminated functional components breaks up the whole into parts and independent or a plurality of functional components are combined to form the "external devices", wherein the "central processing unit" only has a processor, an ROM, an RAM, a wired/wireless connection, a battery or power supply necessary for the function, thereby being especially simplified. The "external devices" with corresponding functions can be extremely developed without being limited by other components, for example, the screens of the external devices can be super large or super small according to user demands Compared with the traditional portable tablet computer, the personal working system available for dynamic combination and adjustment developed according to the present invention is cheaper, more convenient and more human friendly.

The present invention provides a portable personal communication information working system available for dynamic combination and adjustment, including: a central control unit and an external device processing unit for managing one or more external devices. According to the present invention, the central control unit includes an external device identification component and an operating system, which are used for identifying a plurality of external devices and connecting the identified plurality of external devices into a working system. The communication working system provided by the present invention further includes a communication interface for the communication between the central control unit and the external devices (or other external devices). For example, a weak (or short-distance) communication interface for the communication between the central control unit and the external devices; a strong (or medium-distance and long-distance) communication interface for the communication between the central control unit and an external node; the weak communication interface includes Bluetooth; the strong communication interface includes Wi-Fi connection, Internet connection, local area network connection and radio telephone connection.

The present invention provides a technical method, which is brand-new, full-range, omnibearing, and integrated, professional and universal on the highest level, for manufacturers and consumers, bringing brand-new and revolutionary simplicity and economization for the whole field.

To fulfill the above-mentioned purpose, the present invention provides a working system, including:

a central control unit, wherein the central control unit includes an external device identification component which is used for identifying a plurality of external devices and connecting the identified plurality of external devices into a working system.

The present invention further provides a working system, including:

a central control unit, wherein the central control unit includes an external device identification component which is used for identifying a plurality of external devices, and when each time the central control unit is used, the identified plurality of external devices are dynamically connected into a working system.

The present invention further provides a working system, including:

a central processing unit (120); and an external device processing unit (or external device processing service center) (110, 110');

wherein the central processing unit (120) includes:

a central processor (121);

a central communication circuit (122) which is connected with the central processor (121);

the external device processing unit (or external device processing service center) (110, 110') includes:

an external device processor (or an external device server) (111);

an external device interface circuit (104) which is communicated with the external device processor (111);

an external device communication circuit (102) which is connected with the external device processor (111);

wherein the central processing unit (120) communicates with the external device processing unit (or external device processing server) (110, 110') through the central communication circuit (122) and the external device communication circuit (102).

The present invention further provides a method for operating the working system, wherein the working system includes:

a central processing unit (120); and an external device processing unit (or external device processing server) (110, 110'), and the external device processing unit (or external device processing server) is connected with a plurality of external devices (131.1, 131.2, . . . , 131.n);

wherein the method for operating the working system includes the following steps:

the central processing unit (120) sends an external device use request and an ID thereof to the external device processing unit (or external device processing server) (110, 110');

the external device processing unit (or external device processing server) (110, 110') receives the external device use request and the ID;

the external device processing unit (or external device processing server) (110, 110') confirms the ID of the central processing unit, and allows the central processing unit (120) to use a selected external device;

the central processing unit (120) sends the ID of the central processing unit, an ID of the selected external device and an operating instruction and/or data to the external device processing unit (110);

the external device processing unit (or external device processing server) (110, 110') checks the ID of the central processing unit, and correspondingly processes the operating instruction and/or the data through the ID of the external device.

The present invention further provides a central processing unit (120), including:
a central processor (121);
a central communication circuit (122) connected with the central processor (121);
wherein the central processing unit (120) communicates with one or more external device processing units (or external device processing servers) (110, 110'), in order to connect external devices in the external device processing units (or external device processing servers) (110, 110') to the central processing unit (120).

The present invention further provides a method for operating a central processing unit (120), including the following steps:

the central processing unit (120) sending an external device use request to one external device processing unit (or external device processing server) (110, 110');

the central processing unit (120) receiving an approved reply of the external device use request from the external device processing unit (or external device processing server) (110, 110');

the central processing unit (120) sending an ID of a selected external device, an operating instruction and/or data to the external device processing unit (110); and the central processing unit (120) receiving an external device operating result from the external device processing unit (110).

The present invention further provides an external device processing unit (or an external device processing service center) (110, 110'), including:
an external device processor (or an external device server) (111);
an external device interface circuit (104) communicated with the external device processor (111);
an external device communication circuit (102) connected with the external device processor (111);
wherein the external device processing unit (or external device processing server) (110, 110') communicates with one central processing unit (120), in order to connect an external device in the external device processing unit (or external device processing server) (110, 110') to the central processing unit (120).

The present invention further provides a method for operating external device processing units (or external device processing servers) (110, 110'), including the following steps:

receiving an external device use request sent from a central processing unit (120);

sending an approved reply of the external device use request to the central processing unit (120);

receiving a selected external device, an operating instruction and/or data sent from the central processing unit (120);

operating the operating instruction and/or data sent from the central processing unit (120) on the selected external device; and sending an operating result to the central processing unit (120).

The present invention further provides an external device integrated unit, including:
one or more external devices;
an external device processing unit, including:
an external device processor (or an external device server) (111);
an external device interface circuit (104) communicated with the external device processor (111);
an external device communication circuit (102) connected with the external device processor (111);
wherein the external device processing unit (110) communicates with one or more central processing units (120), in order to connect the external devices in the external device processing unit (110) to the one or more central processing units (120).

The present invention further provides a method for operating an external device integrated unit, the external device integrated unit including:
one or more external devices;
an external device processing unit, including:
an external device processor (or an external device server) (111);
an external device interface circuit (104) communicated with the external device processor (111); and
an external device communication circuit (102) connected with the external device processor (111);
wherein the external device processing unit (110) communicates with one central processing unit (120), in order to connect the external device in the external device processing unit (110) to the central processing units (120);
wherein the method includes the following steps:
receiving an external device use request sent from the central processing unit (120);
sending an approved reply of the external device use request to the central processing unit (120);
receiving a selected external device, an operating instruction and/or data sent from the central processing unit (120);
operating the operating instruction and/or data sent from the central processing unit (120) on the selected external device; and
sending an operating result to the central processing unit (120).

The present invention further provides a working system, including:
one central processing unit (120); and
one or a plurality of external device processing units (or external device processing service centers) (110, 110');
wherein the central processing unit (120) includes:
a central processor (121);
a central communication circuit (122) which is connected with the central processor (121);

each one of the external device processing units (or external device processing service centers) (110, 110') includes:

an external device processor (or an external device server) (111);

an external device communication circuit (102) which is connected with the external device processor (111);

wherein the central processing unit (120) communicates with the plurality of external device processing units (or external device processing servers) (110, 110') through the central communication circuit (122) and the external device communication circuit (102).

The present invention further provides a working system, including:

one or more central processing units (120); and one external device processing unit (or external device processing service center) (110, 110');

wherein each one of the one or more central processing units (120) includes:

a central processor (121);

a central communication circuit (122) which is connected with the central processor (121);

the external device processing unit (or external device processing service center) (110, 110') includes:

an external device processor (or an external device server) (111);

an external device communication circuit (102) which is connected with the external device processor (111);

wherein the central processing units (120) communicate with the external device processing unit (or external device processing server) (110, 110') through the central communication circuit (122) and the external device communication circuit (102).

BRIEF DESCRIPTION OF THE DRAWINGS

FIG. 2C is a use state table (or a state tracking table) 203 of an external device group (device group 1, device group 2, . . . , device group n) used in one or more central processing units 120 on the side of an external device processing unit 110 (or an external device processing service center 110');

FIG. 2D is a use state table (or a state tracking table) 204 of an external device 131 (131.1, 131.2, . . . 131.n) or an external device group (device group 1, device group 2, . . . , device group n) in one or more external device processing units 110 (or external device processing service centers 110') used by a certain central processing unit 120 on the side of the central processing unit 120;

FIG. 27 is a partial enlarged view in FIG. 12.

DETAILED DESCRIPTION OF THE EMBODIMENTS

The present invention discloses a novel communication working system, and in particular a novel structure and method of an information system available for dynamic combination.

Figure 1:
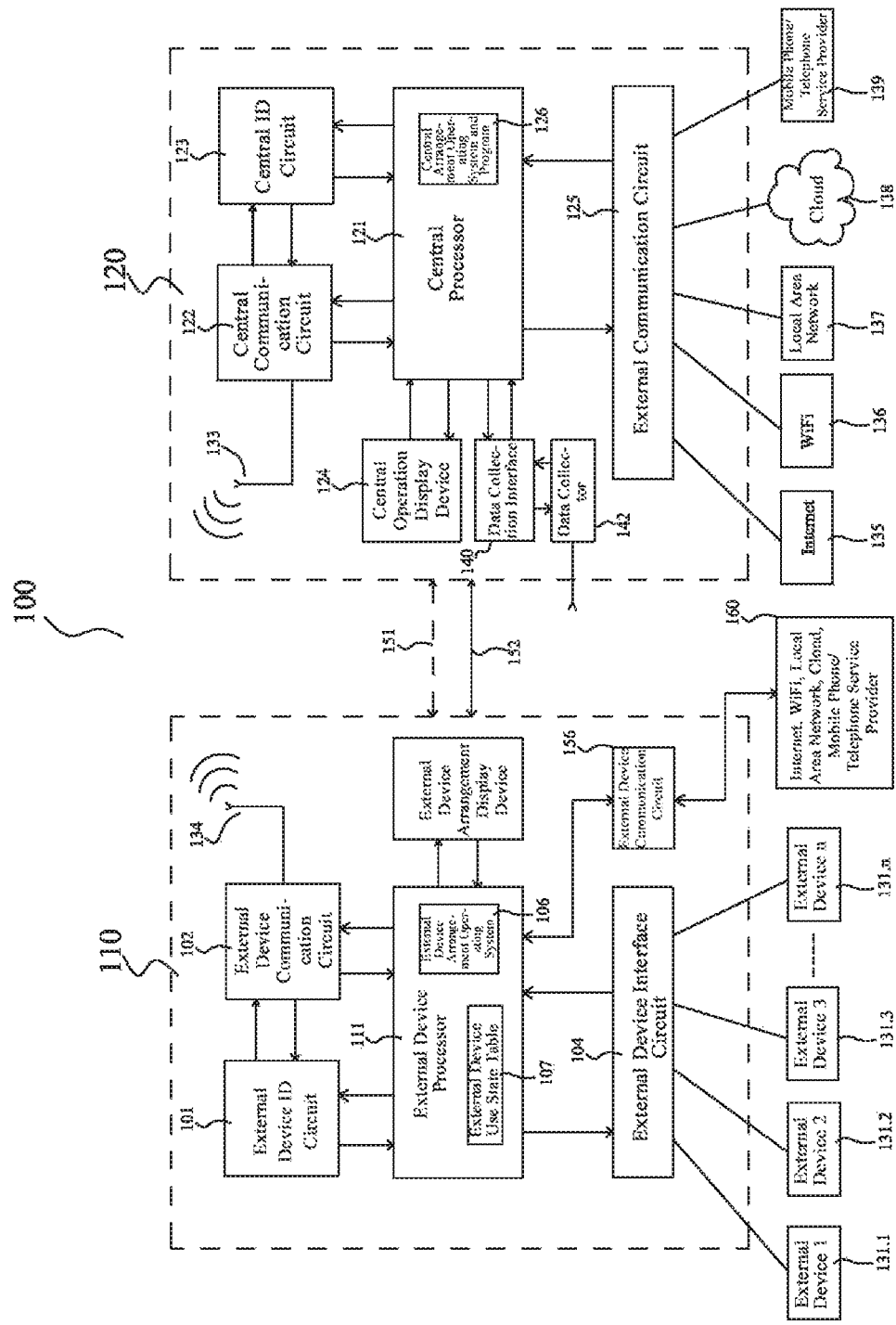
FIG. 1 is a novel communication working system 100 in the present invention.
Figure 10A:
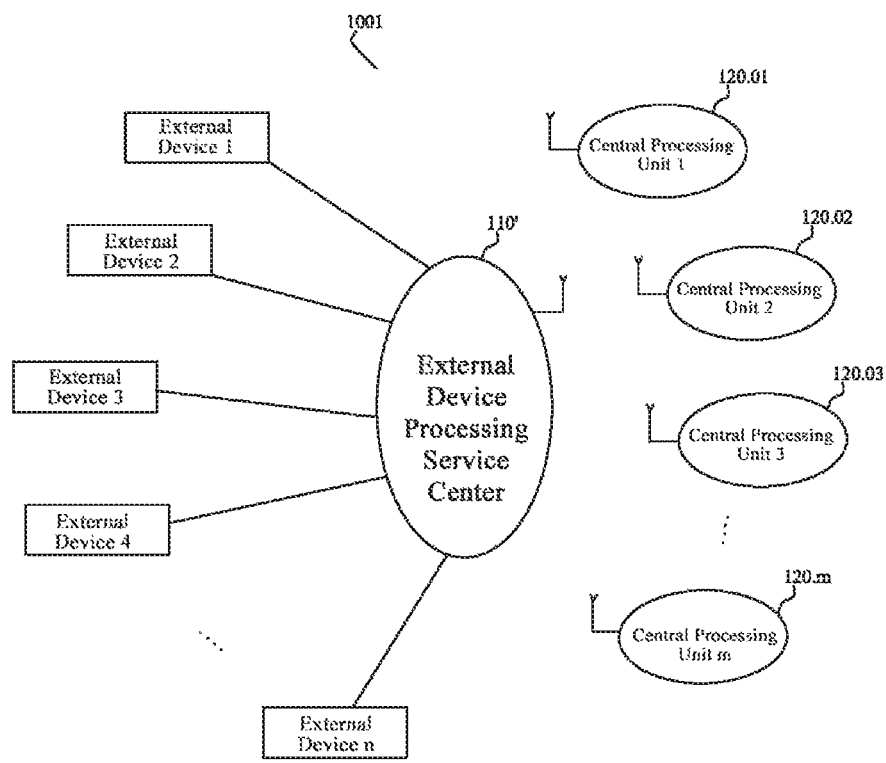
FIG. 10A is a schematic diagram of a structure of a working system 1001 formed by a plurality of central processing units 120 and one external device processing unit 110.
Figure 10B:
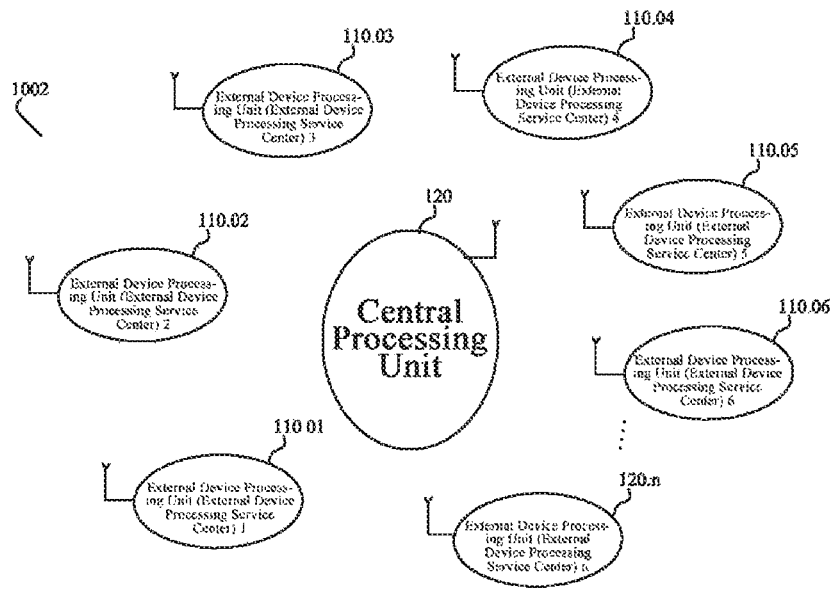
FIG. 10B is a schematic diagram of a structure of a working system 1002 formed by one central processing unit 120 and a plurality of external device processing units.

FIG. 1 is a novel communication working system 100 in the present invention. As shown in FIG. 1, the novel communication working system 100 in the present invention includes a central processing unit 120 and an external device processing unit 110 (or an external device processing service center 110'), and the central processing unit 120 can communicate with the external device processing unit 110 (or the external device processing service center 110') in a wireless or wired manner. As shown in FIG. 10A, in a system open to a plurality of users or provided with a plurality of external devices, the external device processing unit 110 can be a server or a server system (namely, the external device processing service center 110'), and the external device processing unit 110 or the external device processing service center 110' can serve a plurality of central processing units 120 (120.1, 120.2, . . . , 120.m). As shown in FIG. 10B, one central processing unit 120 can communicate with a plurality of external device processing units 110 (110.1, 110.2, 110.n). As shown in FIG. 10B, one central processing unit 120 can be served by a plurality of external device processing units 110 (or external device processing service centers 110').

The central processing unit 120 includes a central processor 121; and a central communication circuit 122 (can be wireless or wired) connected with the central processor 121, a central ID circuit 123 (used for storing the unique ID of the central processing unit 120) connected with the central processor 121, an external communication circuit 125 connected with the central processor 121, a central operation display device 124 connected with the central processor 121, a data collection interface 140 connected with the central processor 121, and a data collector 142 connected with the data collection interface 140. By means of the data collection interface 140, the data collection interface 140 can collect information of the user, and the data collection interface 140 feeds back the collected information of the user to the central processor 121; the central processor 121 can send password information of the user to the external device processing unit 110 (or the external device processing service center 110'), the external device processing unit 110 (or the external device processing service center 110') checks the password information and then allows the central processing unit 120 to access the system thereof, in order to improve the use security. The external communication circuit 125 of the central processing unit 120 connects the central processor 121 (or the central processing unit 120) with an external network node, and the external network node includes Internet 135, WiFi 136, a local area network 137, a cloud (or a cloud service provider) 138 and a telephone service provider 139.

In order to simplify the circuit of the central operation display device 124 and reduce the power consumption to the maximum, the central operation display device 124 can be a simplest black and white liquid crystal display, as long as the simplest display function can be satisfied. The external communication circuit 125 is connected with a plurality of external nodes, and the external nodes can include Internet, WIFI, a local area network, a cloud, a mobile phone or a phone. The central processor 121 is provided with a memory 126, in which a central management operating system and a program are stored. After the central management operating system and the program are operated, the central processor 121 can operate and control all the other circuits in the central processing unit 120.

The external device processing unit 110 includes an external device processor 111; an external device interface circuit 104 communicated with the external device processor 111, an external device communication circuit 102 (can be in a wireless or wired manner) connected with the external device processor 111, an external device ID storage circuit 101 (used for storing the unique ID of the external device processing unit 110 or the external device processing service center 110') connected with the external device processor 111, an external device management display device 103 connected with the external device processor 111, and an external communication circuit 156 connected with the external device processor 111. The external device interface circuit 104 is connected with a plurality of external devices 131 (131.1, 131.2, . . . , 131.n), and the external devices can include a keyboard, a mouse, a microphone, a loudspeaker, a display screen, a screen, a scanner or the like. The external device processor 111 is provided with a memory 106, in which an external device management operating system and a program are stored. After the external device management operating system and the program are operated, the external device processor 111 can operate and control all the other circuits in the external device processing unit 110. By means of the external device management display device 103, a system manager can set the external device processing unit 110 according to demands, for example, increasing the external devices 131 (131.1, 131.2, . . . , 131.n), setting parameters of the interface circuits of the external devices 131 (131.1, 131.2, . . . , 131.n), and the like.

In the present invention, the ID of the central processing unit 120 and the ID of the external device processing unit 110 (or the external device processing service center 110') are applied to mutual match, mutual recognition and mutual authentication. Just as the external communication circuit 125 of the central processing unit 120, the external communication circuit 156 of the external device processing unit 110 (or the external device processing service center 110') forms communication connection between the external device processor 111 (or the external device processing unit 110) and an external network node, and the external network node includes Internet, WIFI, a local area network, cloud (or a cloud service provider) and a telephone service provider. The external device processing unit 110 is provided with the external communication circuit 156, the external communication circuit 125 in the central processing unit 120 can be omitted, and the central processing unit 120 can communicate with the external network node through the external device processing unit 110 (or the external device processing center 110') to further minimize the central processing unit 120. Moreover, the external communication circuit 156 is arranged in the external device processing unit 110 (or the external device processing center 110'), and the external communication circuit 125 in the central processing unit 120 is omitted, when needing additional and new communication protocol or technology, only the external communication circuit 156 of the external device processing unit 110 is modified, and the central processing unit 120 does not need to be modified.

The central processing unit 120 communicates with the external device processing unit 110 through the central communication circuit 122 and the external device communication circuit 102 of the external device processing unit 110, and the communication manner can be a wireless manner or a wired manner. The application external devices 131 (131.1, 131.2, . . . , 131.n) exchange no data with each other, the application external devices 131 only send data or commands to the central processing unit 120 or receive data or commands transmitted by the central processing unit 120. The central processing unit 120 processes the data or commands transmitted by the application external devices 131 (131.1, 131.2, . . . , 131.n) to generate a result and then may send the result to one or a plurality of application external devices 131 (131.1, 131.2, . . . , 131.n) for execution. The functions of the application external devices 131 (131.1, 131.2, . . . , 131.n) can be repeated (for example, a plurality of screens simultaneously display information, data and commands sent by the central processing unit 120). A plurality of application external devices 131 (131.1, 131.2, . . . , 131.n) can be combined into an external device group (for example, a mouse, a keyboard, a display screen, a loudspeaker and a microphone), the matched application external devices 131 (131.1, 131.2, . . . , 131.n) are combined into an external device group, and then the external device group, as an entirety, is paired with the central processing unit 120 for communication. The application external devices 131 (131.1, 131.2, . . . 131.n) can be paired with a plurality of central processing units 120 for use within different time periods; but within the same time period, the same application external device 131 (131.1, 131.2, . . . , 131.n) or the same external device group can only be paired with one central processing unit 120 for communication.

As another embodiment, in the central processing unit 120, the central communication circuit 122, the central ID circuit 123 and the external communication circuit 125 can be integrated into the central processor 121. Similarly, in the external device processing unit 110, the external device communication circuit 102, the external device request ID circuit 101 and the external device interface circuit 104 can be integrated into the external device processor 111.

In FIG. 1, the ID of the central processing unit 120 and the wireless communication of the external device processing unit 110 (or the external device processing service center 110') are denoted by double-phase dotted line connection 151 via an antenna 133 and an antenna 134; wired communication is denoted by double-phase solid line connection 152.

Figure 2A:
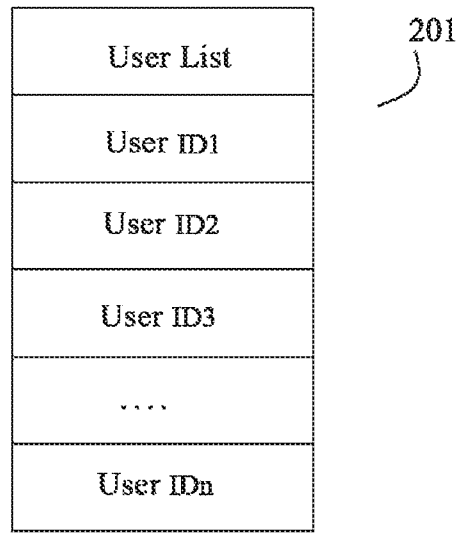
FIG. 2A is a user table 201.

FIG. 2A is a user table 201, which is used for storing the ID of the central processing unit 120, which is allowed to use the external device processing unit 110, in the external device processing unit 110 (or the external device processing service center 110').

Figure 2B:
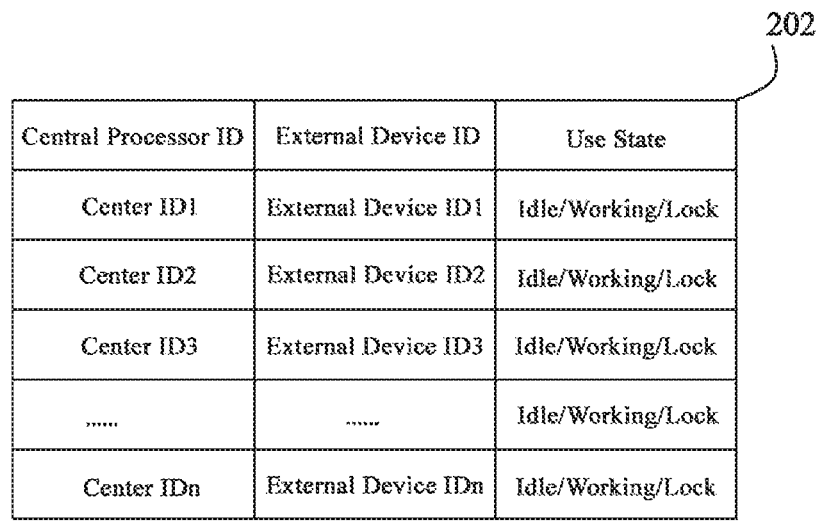
FIG. 2B is a single external device 131 (131.1, 131.2, . . . 131.n) used in one or more central processing units 120.

FIG. 2B is a use state table (or a state tracking table) 202 of a single external device 131 (131.1, 131.2, . . . 131.n) used in one or more central processing units 120 and stored on the side of an external device processing unit 110 (or an external device processing service center 110'), and the use state table is used for indicating the states of the central processing units 120 (120.1, 120.2, . . . , 120.m) accessing the system and the external device 131 used by the central processing units 120 accessing the system. Specifically, the first column of the use state table 202 is the ID (can be used for denoting the ID of the user) of the central processing unit; the second column of the use state table 203 is the ID (can be used for denoting the external device) of the external device 131; the third column of the use state table 201 is the state of the external device 131, which includes three working states of idle, lock and working.

FIG. 2C is a use state table (or a state tracking table) 203 of an external device group (device group 1, device group 2, . . . , device group n) used in one or more central processing units 120 and stored on the side of an external device processing unit 110 (or an external device processing service center 110'), and the use state table is used for indicating the states of the central processing units 120 (120.1, 120.2, . . . , 120.m) accessing the system and the external device group used by the central processing units 120 accessing the system. Specifically, the first column of the use state table 203 is the ID (can be used for denoting the ID of the user) of a certain central processing unit; the second column of the use state table 203 is the ID of the external device group; the third column of the use state table 203 is the ID (can be used for denoting the external device) of each device in the external device group; the fourth column of the use state table 203 is the state of the external device group, which includes three working states of idle, lock and working. By means of the use state table 203 of the external device group, in the external device request of the central processing unit 120 to the external device processing unit 110 (or the external device processing service center 110'), all the devices in a device group can be selected in one request. In this case, the external device processing unit 110 (or the external device processing service center 110') can combine the external devices in an optimized use manner. If lacking the group selection function, when a plurality of central processing units 120 (120.1, 120.2, . . . , 120.m) request external device services from one external device processing unit 110 (or external device processing service center 110'), it is difficult for a certain central processing unit 120 to obtain an optimized external device combination.

Before the external device or the external device group is operated, the external device processing unit 110 (or the external device processing service center 110') fills the IDs (central ID1, central ID2, central ID3, . . . , central IDn) of the central processing units in the first column of the use state table 202 of the external device or in the first column of the use state table 203 of the external device, to indicate that all the central processing units with the IDs (central ID1, central ID2, central ID3, . . . , central IDn) are using the corresponding external devices or external device groups in the external device processing unit 110 (or the external device processing service center 110'); in a subsequent use process, the contents of the corresponding row in the table are updated according to the received ID of the central processing unit. The state table 202 and the state table 203 reflect one or more central processing units 120 using the external device processing unit 110 (or the external device processing service center 110') at the moment.

FIG. 2D is a use state table (or a state tracking table) 204 of an external device 131 (131.1, 131.2, . . . 131.n) or an external device group (device group 1, device group 2, . . . , device group n) in one or more external device processing units 110 (or external device processing service center 110') used by a certain central processing unit 120 and stored at the end of the central processing unit 120. Specifically, the first column of the use state table 204 is the ID of the external device processing unit (or the external device processing service center); the second column of the use state table 204 is the ID (can be used for denoting the requested or used external device or external device group) of the external device or the external device group; the third column of the use state table 204 is a request content; the fourth column of the use state table 204 is an operating state, which includes three states of refusing, waiting for an operating result and completing. After the central processing unit 120 receives a request approval from the external device processing unit 110 (or the external device processing service center 110'), the central processing unit 120 fills the ID of the external device processing unit 110 (or the external device processing service center 110') in the first column of the use state table 204; in a subsequent use process, the contents of the corresponding row in the table are updated according to the received ID of the external device or the external device group. The state table 204 reflects one or more external device processing units 110 (or external device processing service center 110') used by the central processing units 120 at the moment.

The tables in FIGS. 2A-C are stored in the external device processing unit 110 (or the external device processing service center 110'), such that the external device processing unit 110 (or the external device processing service center 110') can check and track the communication and use conditions of one or more central processing units 120 on the external device processing unit 110 (or the external device processing service center 110'). The stable in FIG. 2D is stored in the central processing unit 120, such that the central processing unit 120 can check and track the communication and use conditions of one or more external device processing units 110 (or external device processing service centers 110'). Due to the setup of the use state (or state tracking) tables 201-204, a certain central processing unit 120 can communicate with a plurality of external device processing units 110 (or external device processing service centers 110'), and a certain external device processing unit 110 (or external device processing service center 110') can communicate with a plurality of central processing units 120.

Figure 3:
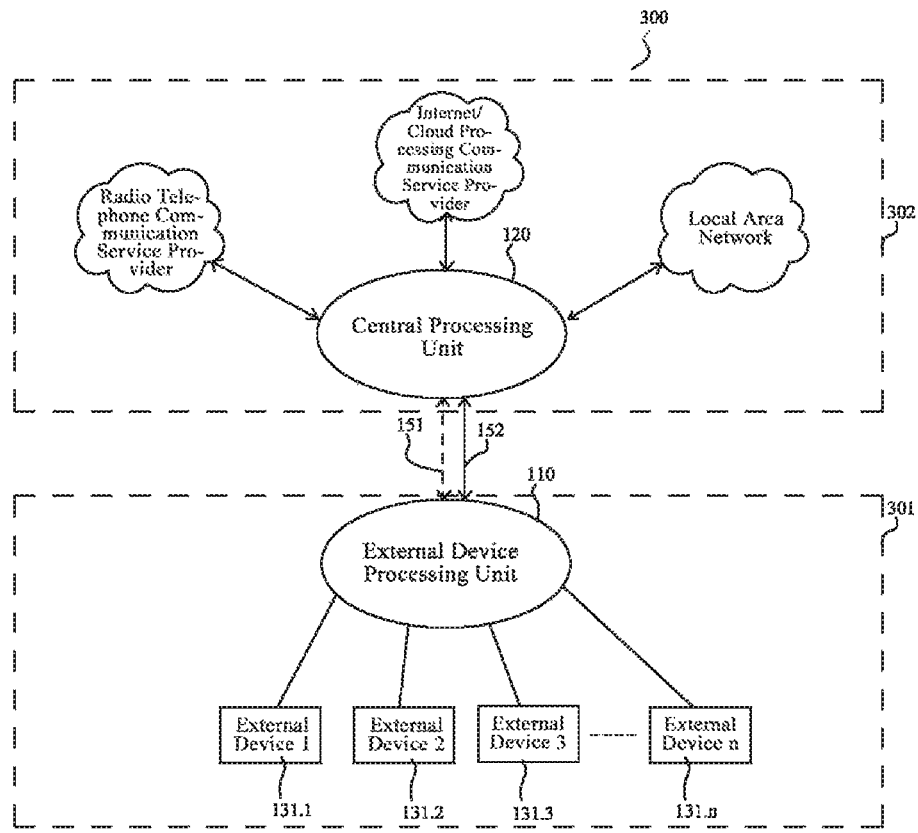
FIG. 3 is a schematic diagram of a structure of a communication working system 300 formed in the present invention.
Figure 14:
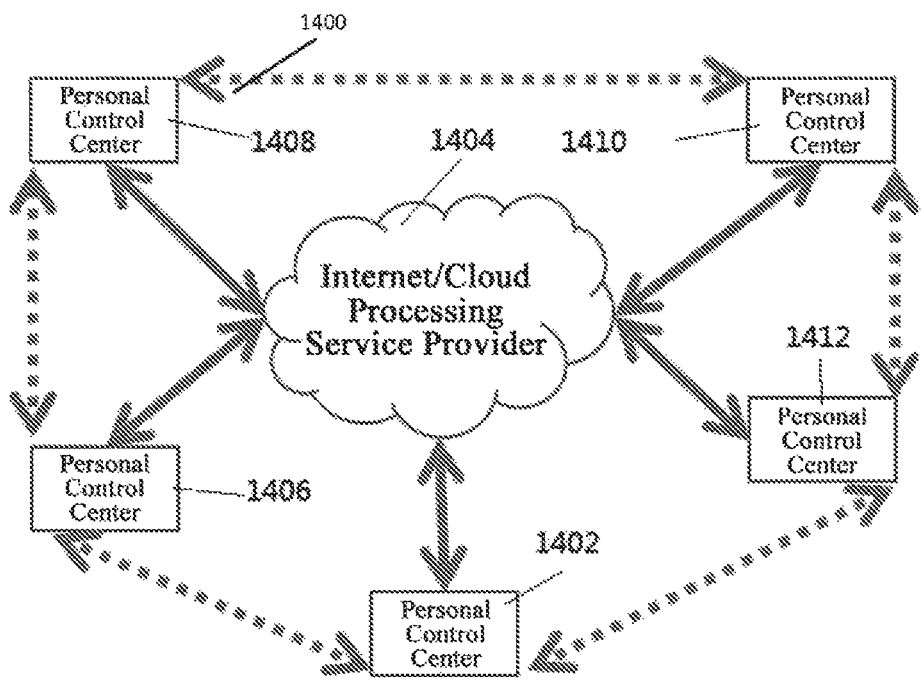
FIG. 14 is an embodiment of interaction of a plurality of personal control centers via an external network in the present invention.

FIG. 3 shows a communication working system 300 formed in the present invention. The communication working system 300 is composed of a central processing unit 120 and an external device processing unit 110. The central processing unit 120 communicates with the external device processing unit 110 (can be in a wireless manner or a wired manner); the central processing unit 120 can communicate with the external network node through the external communication circuit 125 thereof, and the external network node includes a radio telephone communication service provider 161, an internet/cloud processing service provider 162 and a local area network 163 for communication. Meanwhile, the central processing unit 120 communicates with the external device processing unit 110 (or the external device processing service center 110') through the communication circuit 122 thereof, so as to connect an external device 1, an external device 2, an external device 3 . . . , and an external device n. In the system in FIG. 3, for the central processing unit 120, the external device processing unit 110 (or the external device processing service center 110') and the application external devices 131 (131.1, 131.2, 131.n) form an internal network 301, and the radio telephone communication service provider 161, the internet/cloud processing service provider 162 and the local area network 163 form an external network 302. By means of the internal network 301, the central processing unit 120 can select different external devices 1, external devices 2, external devices 3, . . . , external devices n to form a working system capable of completing one or more tasks; by means of the external network 302, a plurality of central processing units 120 (120.1, 120.2, . . . , 120.m) can be connected for communication (as shown in FIG. 14). Moreover, the external device processing unit 110 in the communication working system 300 as shown in FIG. 3 is a portable mobile device and is especially connected with several portable devices for convenient use in travel, for example, a keyboard, a mouse, a hard disk and a small screen.

Figure 4:
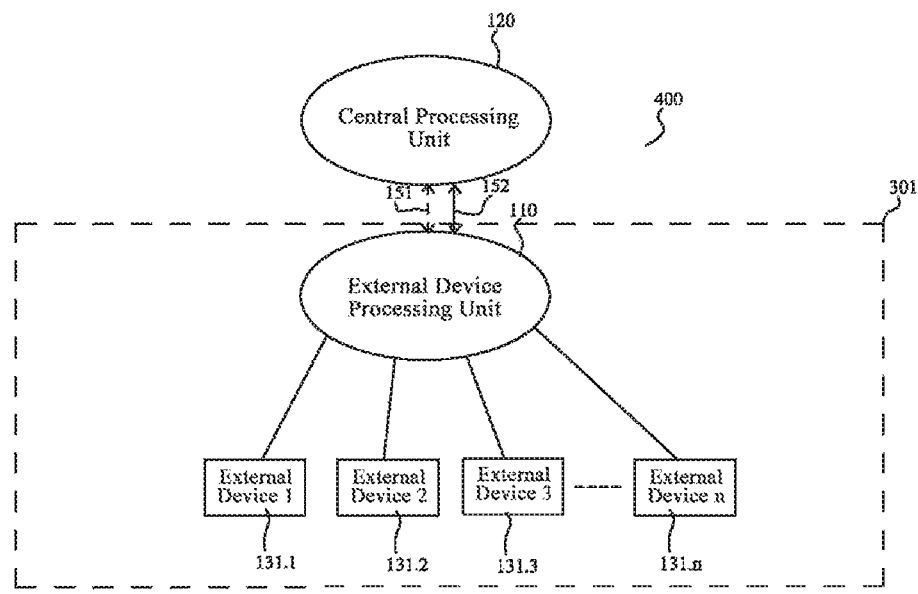
FIG. 4 is a schematic diagram of a structure of a communication working system 400 formed in the present invention.

FIG. 4 shows a communication working system 400 formed in the present invention. Similar to the working system 300, the working system 400 is composed of a central processing unit 120 and an external device processing unit 110. The central processing unit 120 communicates with the external device processing unit 110 (can be in a wireless manner or a wired manner); but the central processing unit 120 does not communicate with the external network node, namely in the working system provided by the present invention, the internal network 301 and the external network 302 can work separately and independently. In the working system as shown in FIG. 4, after the external network 302 is removed, the working system can work independently. In the communication working system 400, the central processing unit 120 can communicate with the external network node through the external device processing unit 110.

Figure 5:
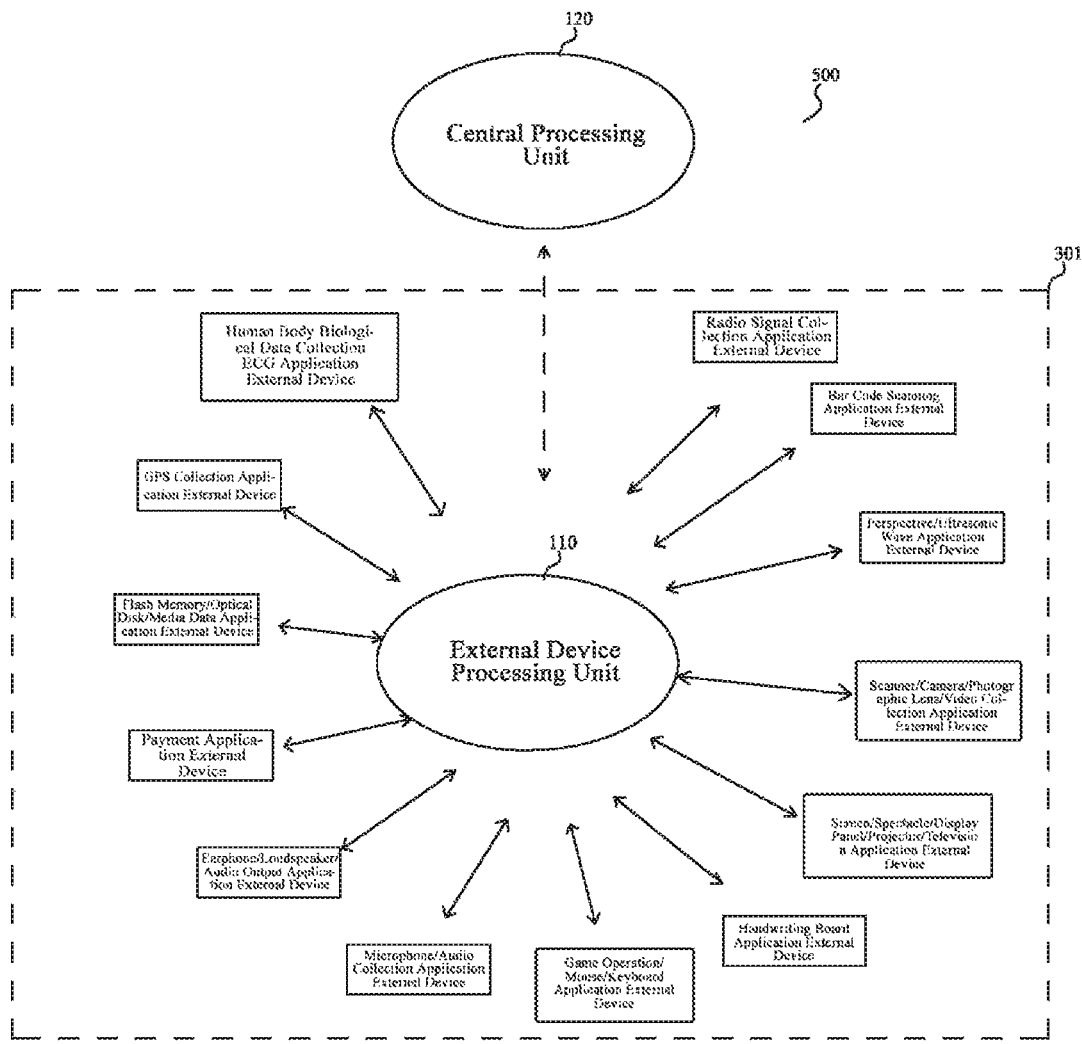
FIG. 5 is a schematic diagram of a structure of a communication working system 500 formed in the present invention.

FIG. 5 shows a communication working system 500 formed in the present invention. By means of the external device processing unit 110 (or the external device processing service center 110'), the central processing unit 120 is connected with a variety of external devices with specific functions or applications, and the external devices include a human body biological data collection ECG application external device, a GPS collection application external device, a flash memory/optical disk/media data application external device, a payment application external device, an earphone/loudspeaker/audio output application external device, a microphone/audio collection application external device, a game operation/mouse/keyboard application external device, a handwriting board application external device, a screen/spectacle/display panel/projector/television application external device, a scanner/camera/photographic lens/video collection application external device, a perspective/ultrasonic application external device, a bar code scanning application external device, a wireless signal collection application external device, etc. According to demand, the central processing unit 120 can select any combination of the variety of external devices.

Figure 6:
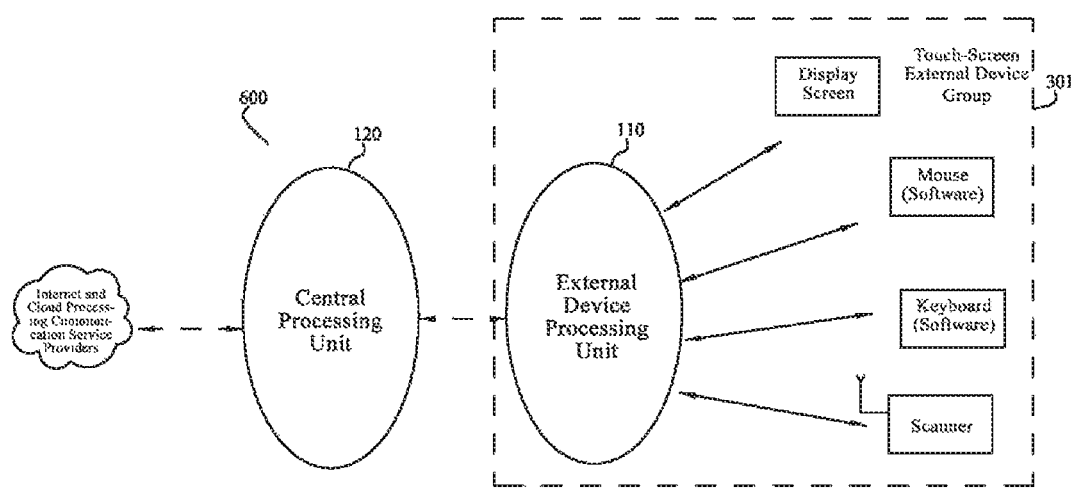
FIG. 6 is a schematic diagram of a structure of a communication working system 600 formed in the present invention.

FIG. 6 shows a communication working system 600 formed in the present invention. As shown in FIG. 6, a control central processing unit 120 requests to use an external device (including a display screen, a mouse, a keyboard and a scanner) from the external device processing unit 110, and a personal control central processing unit 120 exchanges verification information with the external device processing unit 110 after responding to a pairing call. Pairing is achieved by verification. After the control central processing unit 120 is paired and connected with the display screen, the mouse external device, the keyboard and the scanner, the communication working system 600 is constituted. By means of the external communication circuit 125, the personal control central processing unit 120 communicates with an internet cloud processor to send a scanned file to the internet cloud processor for storage.

Figure 7:
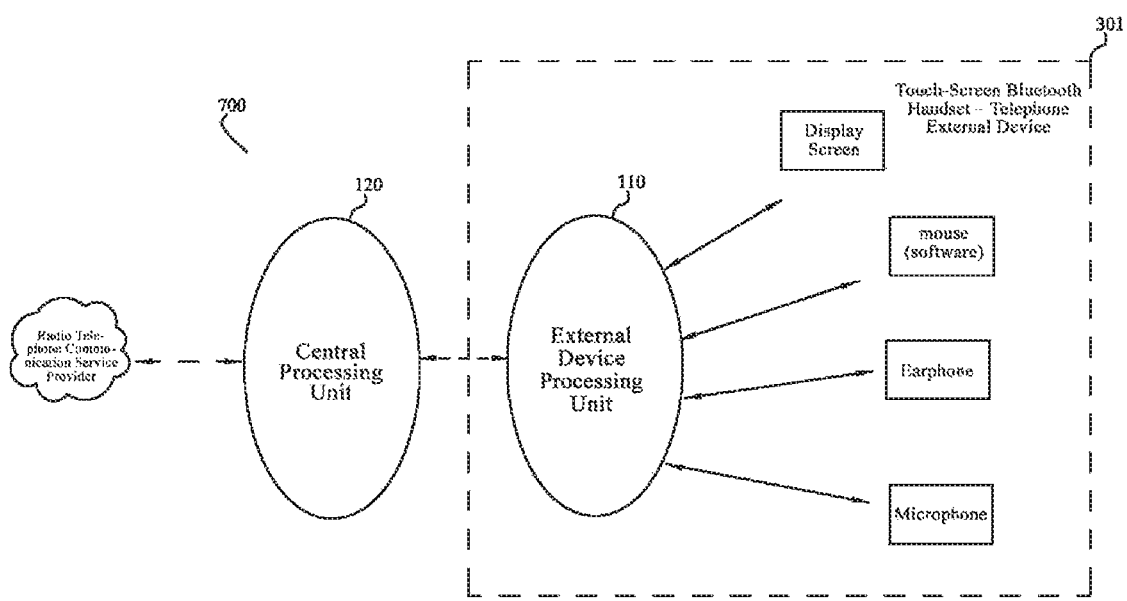
FIG. 7 is a schematic diagram of a structure of a communication working system 700 formed in the present invention.

FIG. 7 shows a communication working system 700 formed in the present invention. As shown in FIG. 7, the control central processing unit 120 requests to use an external device (including a display screen, a mouse, a keyboard, a microphone and a telephone receiver) from the external device processing unit 110, and the control central processing unit 120 exchanges verification information with the external device processing unit 110 after responding to a pairing call. Pairing is achieved by verification. After the personal control central processing unit 120 is paired and connected with the display screen, the mouse external device, the keyboard, the microphone and the telephone receiver, the communication working system 700 is constituted. By means of the external communication circuit 125, the control central processing unit 120 communicates with a radio telephone communication provider for calling.

Figure 8:
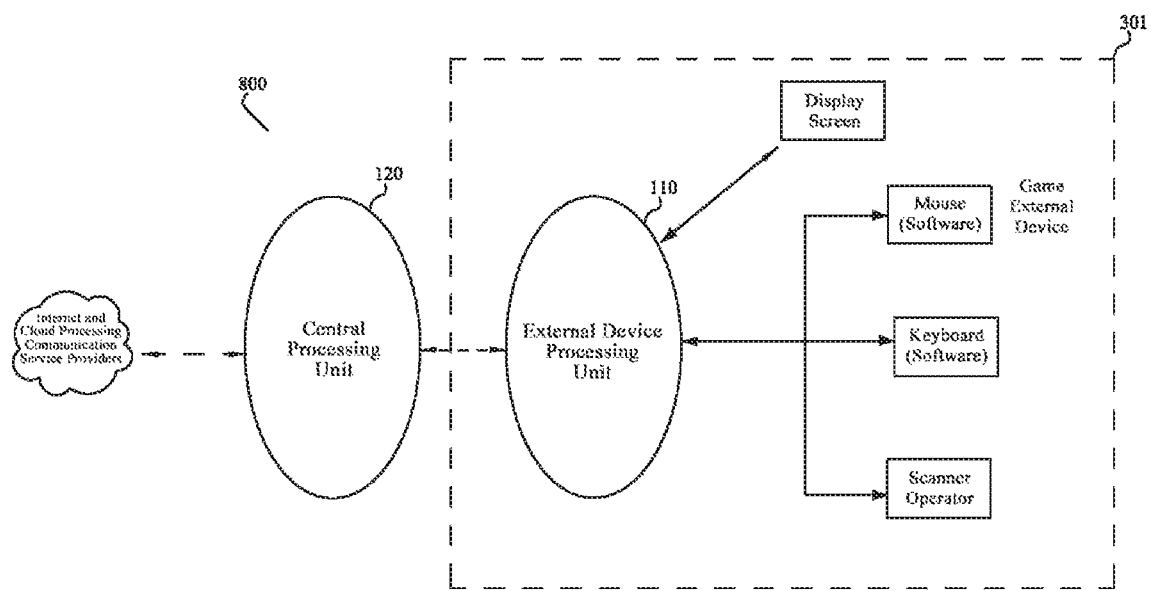
FIG. 8 is a schematic diagram of a structure of a communication working system 800 formed in the present invention.

FIG. 8 shows a communication working system 800 formed in the present invention. As shown in FIG. 8, the control central processing unit 120 requests an external device (including a display screen, a mouse, a keyboard and a game operating external device) from the external device processing unit 110, and the personal control central processing unit 120 exchanges verification information with the external device processing unit 110 after responding to a pairing call. Pairing is achieved by verification. After the control central processing unit 120 is paired and connected with the display screen, the mouse external device, the keyboard and the game operating external device, the communication working system 800 is constituted. By means of the external communication circuit 125, the control central processing unit 120 communicates with the internet cloud processor to play games.

Figure 9A:
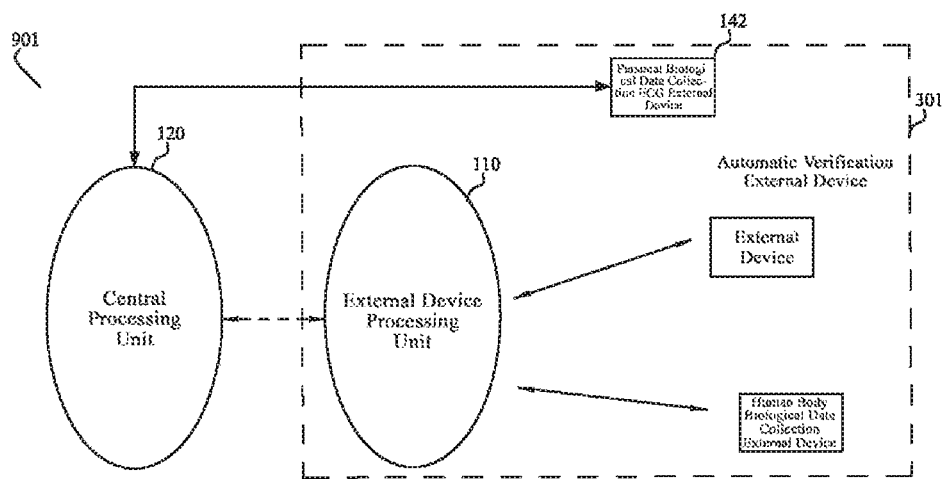
FIG. 9A is a schematic diagram of a structure of a communication working system 901 formed in the present invention.

FIG. 9A shows a communication working system 901 formed in the present invention. As shown in FIG. 9A, the control central processing unit 120 requests to use a security authentication external device (including a personal biological data collection ECG external device, a human body biological data collection external device and an automatic authentication external device) from the external device processing unit 110, in order to set up a quick, highly safe and reliable combination of external device pairing and authentication and identification. For example, a human body biological data collection external device is paired with a personal control center of an owner at first to collect the biological data of the owner, for example such biological information as heartbeat frequency, blood oxygen content, electrocardiogram wave form ECG and fingerprint of the owner and the like, and the biological data of the owner is analyzed and recorded to form the biological fingerprint of the owner; when an operator (owner) holds/touches another external device with a built-in human body biological data collection ECG external device, the human body biological data of the operator can be collected and transmitted into the control central processing unit, the control central processing unit analyzes the detected data, compares the detected data with the stored biological fingerprint, and can even compare the detected data with real-time data, and the control central processing unit can automatically accept the request of the external device after confirmation of conformity. This set of hardware can form a set of (external device+human body biological data collection external device+battery) automatic pairing safe external device group. This function can be used in such fields as online payment, safe sign in, etc. A personal control center user can immediately use an external device once taking up the same and can even continue to read a novel and watch a program from a halted place. For the demand of a higher level of confidentiality of information, the authenticity of the user needs to be usually verified more accurately in the fields of finance, security and national defense, at this time, a personal information collection external device closely matched with the personal control center can collect the electrocardiogram information of a sanyinjiao acupuncture point of an ankle of the user, because the human body data size of the sanyinjiao is larger, more accurate and more secret than the data sizes of other positions, and the collection device external device is more convenient to wear. When the user touches the function external device needing to be matched by a hand, the function external device can collect the human body information of the user through the touched skin of the user and compare the human body information with the real-time data collected by the personal control center, so as to decisively and accurately judge whether the toucher and the personal control center carrier are the same person, so as to achieve a higher level of identification and authentication.

Figure 9B:
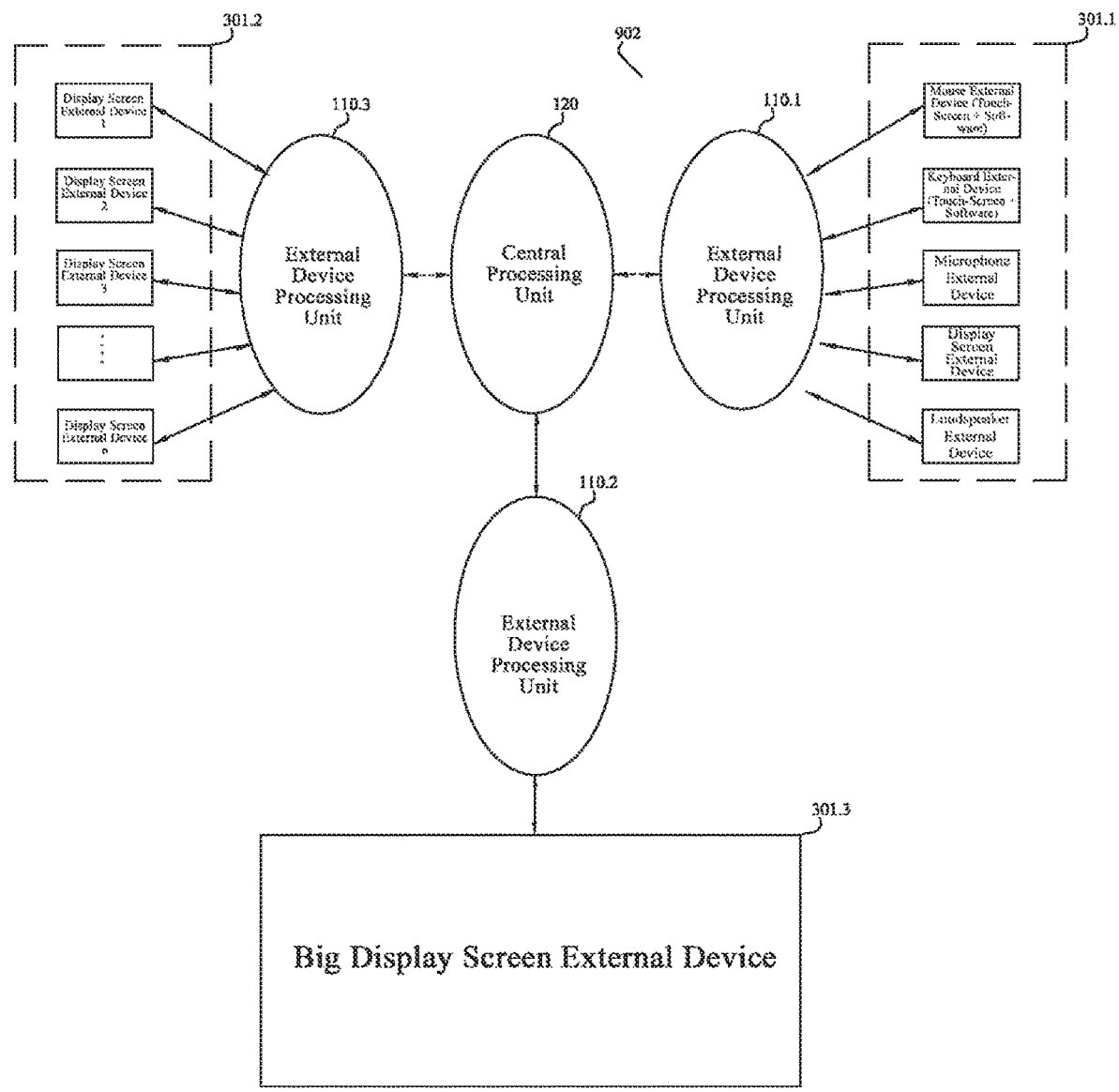
FIG. 9B is a schematic diagram of a structure of a communication working system 902 formed in the present invention.

FIG. 9B shows a communication working system 902 formed in the present invention for demonstrating a working system for simultaneously connecting multiple external device processing units 110.1, 110.2, 110.3 in a one-connect-to-multiples manner. As shown in FIG. 9B, a lecturer carries the control central processing unit 120 and requests to use a lecture external device (the lecture external device includes a mouse, a keyboard, a microphone and a self-use display screen) from an external device processing unit 110.1, and after the control central processing unit 120 of the lecturer is connected with the mouse, the keyboard, the microphone and the self-use display screen external device, a lecture working external device group is constituted. The lecturer further uses the central processing unit 120 to request to use a class audience external device (including a large audience display screen) from an external device processing unit 110.2, and after the control central processing unit 120 of the lecturer is connected with the large audience display screen external device, a class audience external device group is constituted. The lecturer further uses the central processing unit 120 to request to use a remote audience external device (including a remote display external device 1, a display external device 2, ..., a display external device n) from an external device processing unit 110.3, and after the control central processing unit 120 of the lecturer is connected with the remote display external device 1, the display external device 2 ..., and the display external device n, a remote audience external device group is constituted. By means of the external device processing unit 110.1, the external device processing unit 110.2 and the external device processing unit 110.3, the control central processing unit 120 of the lecturer forms the communication working system 900, and the lecturer can give lectures and give lessons.

Figure 9C:
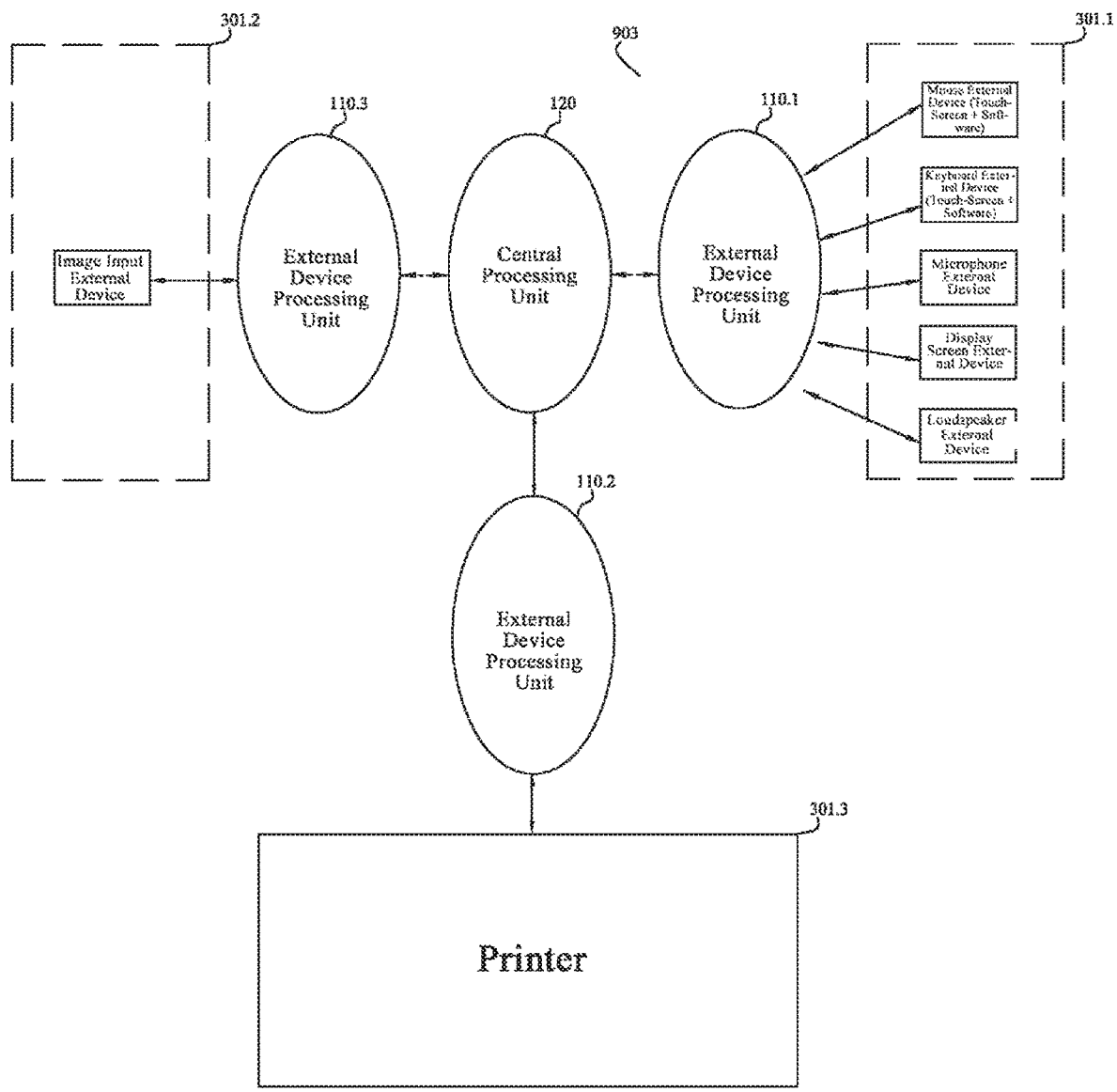
FIG. 9C is a schematic diagram of a structure of a communication working system 903 formed in the present invention.

FIG. 9C shows a communication working system 903 formed in the present invention for demonstrating a working system for simultaneously connecting multiple external device processing units 110.1, 110.2, 110.3 in a one-connect-to-multiples manner. As shown in FIG. 9C, the central processing unit 120 requests to use a basic external device (including a mouse, a keyboard, a microphone, a loudspeaker and a display screen) from the external device processing unit 110.1, and after the central processing unit 120 is connected with the mouse, the keyboard, the microphone, the loudspeaker and display screen external device, a basic working external device group is constituted. The central processing unit 120 further requests to use a printer external device from the external device processing unit 110.2, and after the central processing unit 120 is connected with the printer external device, the working system 902 has a printing function. The central processing unit 120 further requests to use an image input external device from the external device processing unit 110.3, and after the central processing unit 120 is connected with the image input external device, the working system 902 has an image input function. By means of the external device processing unit 110.1, the external device processing unit 110.2 and the external device processing unit 110.3, the central processing unit 120 forms the communication working system 902, and the user can perform printing and image input operations. In FIG. 9C, the central processing unit 120 simultaneously communicates with the three external device processing units 110.1, 110.2 and 110.3. Under this setup, the three external device processing units 110.1, 110.2 and 110.3 have their own IDs to be paired with the central processing unit 120 for use.

Figure 9D:
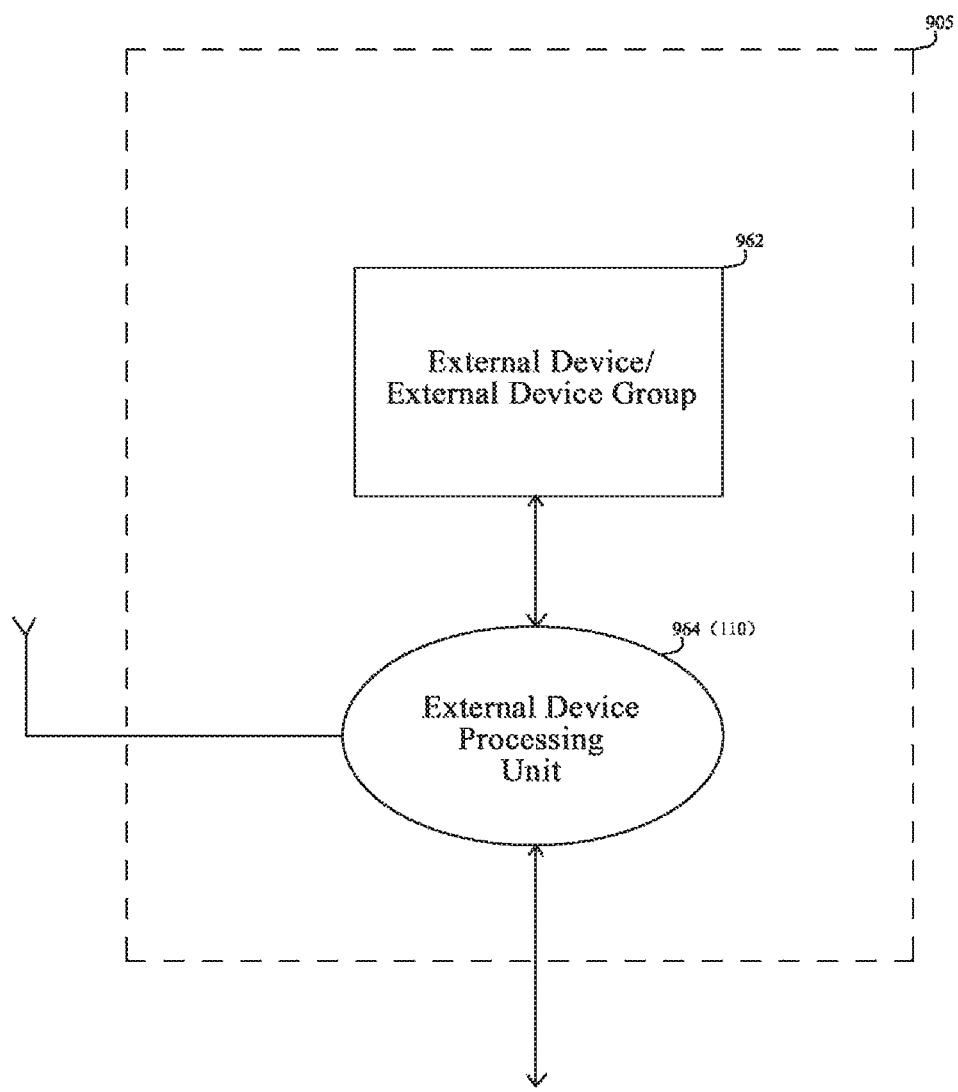
FIG. 9D is a schematic diagram of a structure of an external device integrated unit 905 formed in the present invention.

FIG. 9D shows an external device integrated unit 905. As shown in FIG. 9D, the external device integrated unit 905 includes a single external device or an external device group 962 and an external device processing unit 964 (or 130). The external device can be a printer external device, a scanner external device or an image input external device; the external device group can be a group of devices, for example, a mouse, a keyboard, a microphone, a loudspeaker and a display screen external device. The external device integrated unit 905 can have a unique external device ID used for marking the external device integrated unit 905. The structure and the function of the external device processing unit 964 are the same as or similar to those of the external device processing unit 110 in FIG. 1. The external device integrated unit 905 as shown in FIG. 9D can communicate with any central processing unit 120. The structure of the external device integrated unit 905 has the advantages that an external device manufacturer can especially configure an external device processing unit 964 (or 110) to any external device or a group of external devices manufactured thereafter, and the ID, the external device parameter, the external device invocation command, the external device communication protocol and the instruction for use of the external device integrated unit 905 are set in advance. After buying any external device or a group of external devices, the user sets the parameter, the invocation command and the communication protocol of the central processing unit 120 according to the instruction for use of the external device, to enable the central processing unit 120 to communicate with the external device integrated unit 905, so that the external device or the external device group can be used. Due to this modularized setup, the central processing unit 120 can be conveniently connected with any external device or external device group singly manufactured.

FIG. 10A shows a system 1001 open to a plurality of users and providing a plurality of external devices. As shown in FIG. 10A, the external device processing service center 110' can be provided with one or more servers and is configured with a plurality of external devices for providing services to a plurality of central processing units 120 (120.1, 120.2, ..., 120.*m*).

FIG. 10B shows a system 1002 provided with a plurality of external device processing units 110 (or external device processing service centers 110'). The plurality of external device processing units 110 (or external device processing service centers 110') can be distributed in different places, different cities or different nations, and as long as within a certain distance range, the control central processing unit 120 can access any external device processing unit 110 (or external device processing service center 110') and obtain the external device service provided by the same.

Figure 10C:
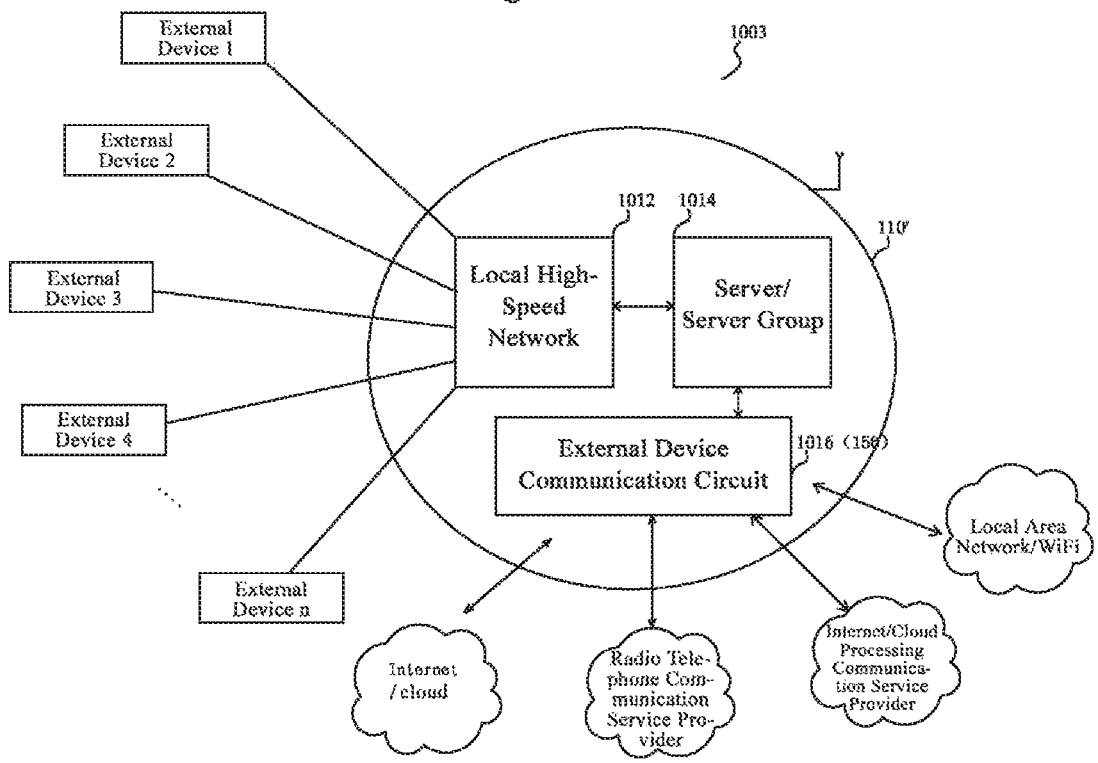
FIG. 10C is a schematic diagram of an internal structure of a working system 1003 formed in the present invention.

FIG. 10C shows a more specific structure 1003 in the external device processing service center 110'. As shown in FIG. 10C, the external device processing service center 110' includes a server/server group 1014, a local high-speed network 1012 and an external communication circuit 1016. Under the control of the server/server group 1014, the local high-speed network 1012 is connected with an external device 1, an external device 2, ..., an external device n, and the server/server group 1014 manages and allocates the external device 1, the external device 2, ..., the external device n to the central processing units 120 (120.1, 120.2, ..., 120.*m*). Under the control of the server/server group 1014, the external device processing service center 110' can indirectly communicate with a radio telephone communication service provider, an internet/cloud processing service provider, a local area network, WIFI or the like, in order to provide radio telephone communication, internet/cloud processing, local area network and WIFI services to the central processing units 120 (120.1, 120.2, ..., 120.*m*). In this way, the external communication circuits 125 (see FIG. 1) of the central processing units 120 (120.1, 120.2, 120.*m*) can be omitted to further simplify the circuits of the central processing units 120 (120.1, 120.2, ..., 120.*m*).

Figure 11:
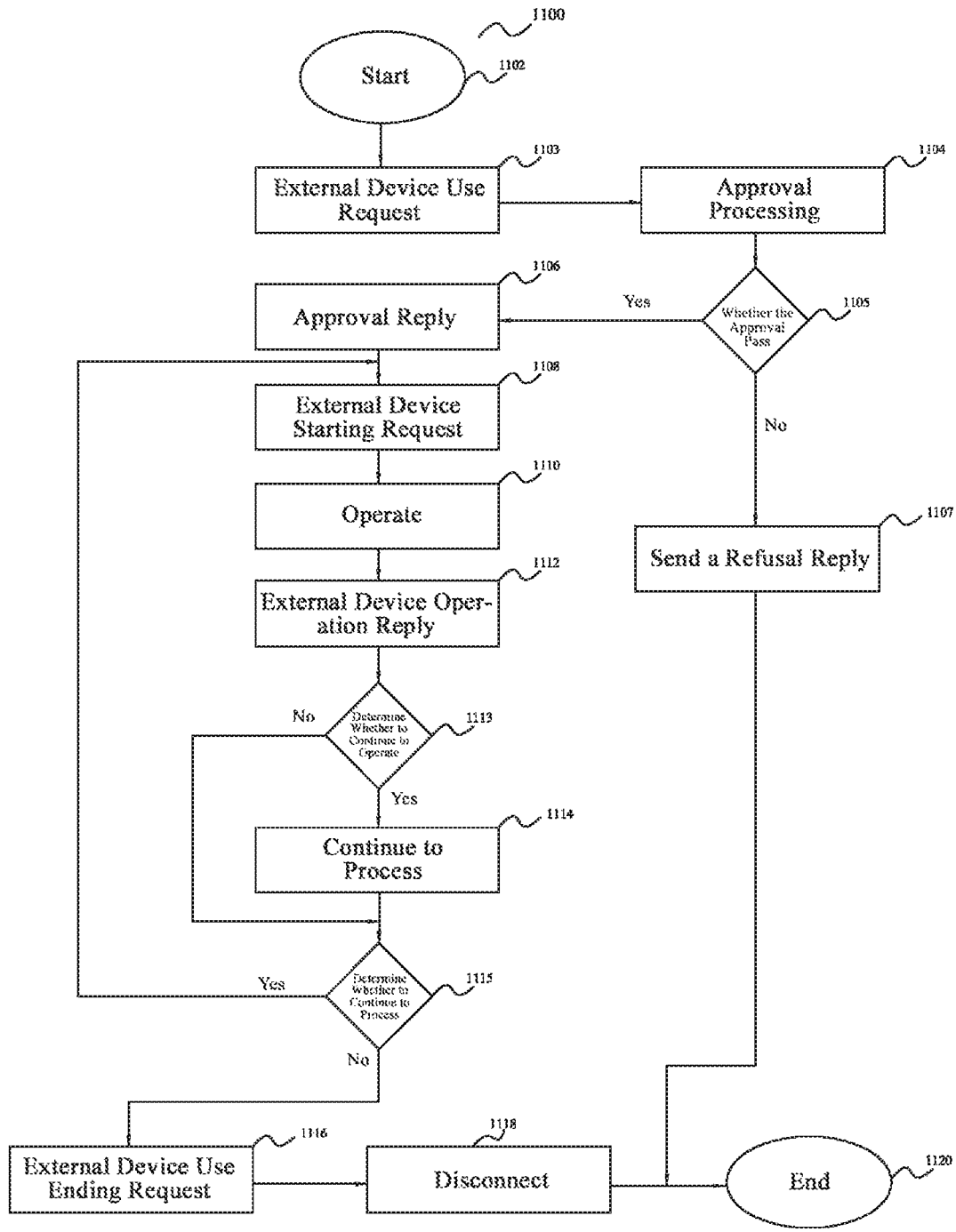
FIG. 11 is a flowchart 1100 of operating a novel communication working system 100 in the present invention.

FIG. 11 is a flowchart 1100 of operating a personal communication working system 100 in the present invention.

Step 1103: after turning from step 1102 to step 1103, a certain central processing unit 120 sends an external device use request to the nearby external device processing unit 110 (or the external device processing service center 110'). When a central processing unit 120 uses the external devices 131 (131.1, 131.2, ..., 131.*n*) in the external device processing unit 110 (or the external device processing service center 110') as shown in FIG. 1 or FIGS. 10A-C, the central processing unit 120 sends the external device use request to the external device processing unit 110 through the central communication circuit 122 thereof, and the external device use request includes the ID of the central processing unit. The ID of the central processing unit 120 is stored in the ID circuit (or memory) 101, each central processing unit 120 has a unique (or special) ID (for example, an IP address or a telephone number). Before the central processing unit 120 sends the external device use request to the external device processing unit 110, the central processor 121 extracts the ID from the central ID circuit (or memory) 123 and feeds back the ID to the central communication circuit 122, so as to send the external device use request to the external device processing unit 110 (or the external device processing service center 110'). The external device use request contains a starting signal and an ending signal; the external device use request further contains a plurality of information segments (including the property of the request), and the plurality of information segments are contained between the starting signal and the ending signal, for facilitating the external device processing unit 110 to intercept the information between the starting signal and the ending signal.

Step 1104: the external device processing unit 110 (or the external device processing service center 110') carries out approval processing. When the central processing unit 120 is located within a certain distance range of the external device processing unit 110 (or the external device processing service center 110'), the external device processing unit 110 (or the external device processing service center 110') receives the external device use request (including the ID thereof) sent by the central processing unit 120 through the external device communication circuit 102 thereof, and the ID of the central processing unit 120 and the external device use request are fed back to the external device processor 111. If the external device processing unit 110 (or the external device processing service center 110') is a closed system (namely, only providing services to the central processing unit registered in advance), the external device processing unit 110 checks whether the received ID is stored in the user table 201 (see FIG. 2A) in advance; if not finding the received ID, the external device processing unit 110 (or the external device processing service center 110') refuses the external device use request; if finding the received ID in the user table 201, the external device processing unit 110 (or the external device processing service center 110') (after checking the password information of the user) primarily approves the external device use request. If the external device processing unit 110 is an open system (namely, providing services to any central processing unit), the external device processing unit 110 (or the external device processing service center 110') primarily approves the external device use request without checking the user table 201. After primarily approving the external device use request, the external device processor 111 checks the use state table 202 (see FIG. 2B) of the external devices and/or the use state table 203 (see FIG. 2C) of the external device groups to confirm whether idle external devices 131 (131.1, 131.2, . . . , 131.*n*) exist. If no idle external device 131 (131.1, 131.2, . . . , 131.*n*) exists (namely, IDs are filled in all the units in the first column of the use state table 202 of the external devices or the first column of the use state table 203 of the external devices; or all the external devices are at a working state), the external device processor 111 refuses the external device use request; if idle external devices 131 (131.1, 131.2, . . . , 131.*n*) exist, the external device processor 111 approves the external device use request.

Step 1105: the external device processing unit 110 (or the external device processing service center 110') judges the approval. If the approval is passed, turning to step 1006 to approve an external device request reply; if the approval is not passed, turning to step 1107 to send an external device request refusal reply to the central processing unit 120, and then turning to step 1120 to terminate the flow.

Step 1106: the external device processing unit 110 (or the external device processing service center 110') sends an external device request approval reply. After approving the external device use request, the external device processor 111 extracts the external device ID from the external device ID circuit (or memory) 101 and sends an external device use request approval reply through the external device communication circuit 102 thereof. The use request approval reply contains a starting signal and an ending signal and further contains a plurality of information segments (including the property of the reply), and the plurality of information segments are contained between the starting signal and the ending signal, for facilitating the central processing unit 120 to intercept the reply information between the starting signal and the ending signal. The request approval reply includes the ID of the external device processing unit 110 (or the external device processing service center 110'), the ID (used for indicating the central processing unit 120 receiving the external device request approval reply) of the central processing unit 120 and the ID of the external device capable of being used or the ID of the external device group capable of being used. Before sending the request reply, the external device processing unit 110 can modify the external device capable of being used in FIG. 2B or the external device group capable of being used in FIG. 2C into a lock state to prohibit the interference by other central processing units 120. If the external device processing unit 110 (or the external device processing service center 110') refuses the external device use request of the central processing unit 120, the external device processing unit 110 (or the external device processing service center 110') notifies the central processing unit 120 of the reason why the external device use request thereof is refused in a wireless communication manner.

Step 1108: the central processing unit 120 sends an external device starting request. After receiving the request approval reply, the central processor 121 in the central processing unit 120 checks whether the center ID of the request approval reply is consistent with the own ID; if so, intercepting the contents in the request approval reply; if not, discarding the contents in the request approval reply. When the ID of the request reply is consistent with the own ID, the central processor 121 displays the ID of the external device capable of being used or the ID of the external device group capable of being used and the title of the external device capable of being used on the central operation display device 124. At this time, the user can select the external device capable of being used or the external device group capable of being used through the central operation display device 124. Due to the selection function of the external device group, in the external device request of the central processing unit 120 to the external device processing unit 110 (or the external device processing service center 110'), all the devices in one device group can be selected in one request. In this case, the external device processing unit 110 (or the external device processing service center) can combine the external devices in an optimized use manner. If lacking the group selection function, when a plurality of external device processing units 110 (110.1, 110.2, . . . , 110.*n*) communicate with one external device processing unit 110 (or external device processing service center 110'), it is difficult for a certain central processing unit 120 to obtain an optimized external device combination. Before sending the external device starting request, the central processing unit 120 fills the ID of the external device processing unit (or the external device processing service center) in the table 204 and fills the external device ID (or the external device group ID) and a request content (namely, the starting request) in the corresponding row. Then, the central processing unit 120 sends the external device starting request through the central communication circuit 122 thereof. The external device starting request contains a starting signal and an ending signal, the external device starting request further contains a plurality of information segments (including the property of the request), and the plurality of information segments are contained between the starting signal and the ending signal, for facilitating the external device processing unit 110 to intercept the information between the starting signal and the ending signal. The external device starting request includes the ID of the external device processing unit 110 (or the external device processing service center 110'), the own ID (the ID of the central processing unit 120), the ID of the selected external device or the ID of the selected external device group, an operating instruction and/or data.

Step 1110: the external device processing unit 110 (or the external device processing service center 110') operates the operating instruction and/or data sent by the central processing unit 120. After receiving the external device starting request, the external device processing unit 110 checks whether the ID of the external device processing unit 110 (or the external device processing service center 110') in the external device starting request is consistent with the own ID; if so, intercepting the contents in the external device starting request; if not, discarding the contents in the external device starting request. After the external device processing unit 110 (or the external device processing service center 110') determines that the external device starting request is received, the external device processor 111 thereof intercepts the ID of the central processing unit 120, the ID of the selected external device or the ID of the selected external device group, the operating instruction and/or data from the external device starting request, and uses the selected external device or external device group to carry out operation processing according to the operating instruction and processing data (or the operating instruction is singly executed). Before carrying out the operation processing, the external device processing unit 110 modifies the selected external device or external device group in the row corresponding to the ID of the central processing unit 120 in the working state table 202 or 203 from a lock state into a working state, and modifies the unselected external device or external device group from the lock state into an idle state.

Step 1112: the external device processing unit 110 (or the external device processing service center 110') sends an external device operation reply. After obtaining an operation processing result, the external device processing unit 110 sends the external device operation reply through the external device communication circuit 102 thereof. The external device operation reply contains a starting signal and an ending signal, the external device operation reply further contains a plurality of information segments (including the property of the request), and the plurality of information segments are contained between the starting signal and the ending signal, for facilitating the external device processing unit 110 to intercept the information between the starting signal and the ending signal; the external device operation reply includes the external device ID of the external device processing unit 110 (or the external device processing service center 110'), the ID of the central processing unit 120 and an external device operation processing result.

Step 1113: the central processing unit 120 judges whether to continue to further process the operating result. After receiving the external device operation reply, the central processor 121 in the central processing unit 120 checks whether the ID of the central processing unit in the external device operation reply is consistent with the own ID; if so, intercepting the contents in the external device operation reply; if not, discarding the contents in the external device operation reply. When the ID of the central processing unit in the request reply is consistent with the own ID, the central processor 121 determines whether the external device operating result needs to be further processed. According to the ID of the external device processing unit (or the external device processing service center), by checking the use state table (or state tracking table) 204, the central processor 121 in the central processing unit 120 can determine that the operating result of which external device processing unit 110 (or the external device processing service center 110') is received and the operating result corresponds to which specific external device request. By means of the ID of the external device processing unit (or the external device processing service center), the central processing unit 120 can simultaneously communicate and connect with a plurality of external device processing units 110 (or the external device processing service centers 110'). If the operating result sent by the external device processing unit 110 (or the external device processing service center 110') needs no further processing, turning to step 1115; if the operating result needs further processing, turning to step 1114.

Step 1114: the central processing unit 120 continues to process the operating result. For example, if the operating result needs to enter an external node (for example, entering the Internet), the central processor 121 enters the Internet processing through the external communication circuit 125 thereof.

Step 1115: the central processing unit 120 determines whether needing to continue to use the external devices 131 (131.1, 131.2, . . . , 131.n) in the external device processing unit 110 (or the external device processing service center 110') having the ID of the external device processing unit (or the external device processing service center). If needing to continue to use the external devices 131 (131.1, 131.2, . . . , 131.n) in the external device processing unit 110, turning to step 1108 to send a new external device starting request; if not needing to continue to use the external devices 131 (131.1, 131.2, . . . , 131.n) in the external device processing unit 110, turning to step 1116.

Step 1116: the central processing unit 120 sends an external device use ending request. When one central processing unit 120 is about to stop using the external devices 131 (131.1, 131.2, . . . , 131.n) in the external device processing unit 110 (or the external device processing service center 110') as shown in FIG. 1 or FIGS. 10A-B, the central processing unit 120 sends the external device use ending request to the external device processing unit 110 (or the external device processing service center 110') through the central communication circuit 122 thereof, and the external device use ending request contains the ID of the external device processing unit (or the external device processing service center) and the own ID (namely the ID of the central processing unit). The external device use ending request contains a starting signal and an ending signal; the external device use ending request further contains a plurality of information segments (including the property of the request), and the plurality of information segments are contained between the starting signal and the ending signal, for facilitating the external device processing unit 110 to intercept the information between the starting signal and the ending signal. Before sending the external device use ending request, the central processing unit 120 removes the ID of the corresponding external device processing unit 110 (or the external device processing service center 110') from the table 204, to indicate no longer using the external device processing unit 110 (or the external device processing service center 110'). When receiving the reply sent by the external device processing unit 110 (or the external device processing service center 110') subsequently, because the ID of the external device processing unit 110 (or the external device processing service center 110') cannot be found in table 204, the central processing unit 120 performs no processing on the reply.

Step 1118: the external device processing unit 110 (or the external device processing service center 110') disconnects the communication connection with the central processing unit 120. After receiving the external device use ending request sent by the central processing unit 120, the external device processor 111 in the external device processing unit 110 checks whether the ID of the external device processing unit (or the external device processing service center) of the external device use ending request is consistent with the own ID; if so, intercepting the contents in the external device use ending request; if not, discarding the contents in the external device use ending request. When determining that the external device use ending request is received, the external device processing unit 110 feeds back the ID of the central processing unit 120 and the external device use ending request to the external device processor 111. The external device processor 111 removes the ID of the central processing unit 120 from the corresponding row in the use state table 202 (see FIG. 2B) of the external devices and/or the use state table 203 (see FIG. 2C) of the external device groups, modifies the state in the corresponding row in the use state table 202 (see FIG. 2B) of the external devices and the state in the corresponding row in the external device groups from the working state into the idle state, and releases the external devices and/or the external device groups in the corresponding row to enable other central processing units to use these released external devices and/or the external device groups.

Then the external device processor 111 turns the operation to the ending step 1120. Step 1120: ending the operation flow.

After the ID of the central processing unit 120 is removed from the use state table 202 (see FIG. 2B) of the external devices and/or the use state table 203 (see FIG. 2C) of the external device groups, if the central processing unit 120 sends the external device use request to the external device processing unit 110 again, the external device processor 111 cannot find out the ID of the central processing unit 120 in the use state table 202 (see FIG. 2B) of the external devices and/or the use state table 203 (see FIG. 2C) of the external device groups any more. Therefore, the external device processing unit 110 sends refusal reply and requires the central processing unit 120 to send the external device use request again, so that the external device processing unit 110 performs the approval processing in step 1105 again.

In order to keep the communication connection with the external device processing unit 110, the central processing unit 120 periodically sends a communication keeping request to the external device processing unit 110 (or the external device processing service center 110') through the central communication circuit 122 thereof. The communication keeping request contains a starting signal and an ending signal, the keeping request contains a plurality of information segments (including the property of the request, the ID of the external device processing unit 110 (or the external device processing service center 110') and the ID of the central processing unit 120), and the plurality of information segments are contained between the starting signal and the ending signal, for facilitating the external device processing unit 110 (or the external device processing service center 110') to intercept the request information between the starting signal and the ending signal. Under the state of keeping communication, the central processing unit 120 keeps the communication state with the external device processing unit 110 and does not need to perform an approval operation in the next communication.

Therefore, after approving the external device use request of a certain central processing unit 120, the external device processing unit 110 (or the external device processing service center 110') periodically inquires and receives the communication keeping request sent by the central processing unit 120. If receiving the communication keeping request from the central processing unit 120 within a regulated duration, the external device processing unit 110 (or the external device processing service center 110') continues to keep a communication channel with the central processing unit 120; if not receiving the communication keeping request (may be because of the departure, shutdown or manual communication disconnection of the central processing unit 120) from the central processing unit 120 within the regulated duration, the external device processing unit 110 (or the external device processing service center 110') disconnects the communication channel with the central processing unit 120, updates the state of the corresponding row in the table as shown in FIG. 2A or FIG. 2B, and modifies the external device or the external device group used by the external device processing unit 110 into the idle state, for enabling other central processing units to use the released external device or the released external device group. If the central processing unit 120 needs to reuse the external device of the external device processing unit 110 thereafter, the operation restarts from the approval step.

In FIG. 10A, a plurality of central processing units 120 (120.1, 120.2, . . . , 120.*m*) and one external device processing service center 110' or one external device processing unit 110 form a working system 1001. In the working system 1001 as shown in FIG. 10A, after startup, each central processing unit 120 (120.1, 120.2, . . . , 120.*m*) always automatically sends the external device use request (including the ID thereof) to the external device processing service center 110' (or the external device processing unit 110) through the external device communication circuit. Once receiving the external device use request of the central processing unit 120 (120.1, 120.2, . . . , 120.*m*), the external device processing service center 110' (or the external device processing unit 110) automatically enters an initial processing program and displays the ID of the central processing unit 120, the access right of the central processing unit 120 in the external device processing unit 110 and the external device conditions of the external device processing service center 110' (or the external device processing unit 110) on a display screen. Since needing to face to a plurality of central processing units 120 (120.1, 120.2, . . . , 120.*m*) and carrying a plurality of external devices, the external device processing service center 110' as shown in FIG. 10A can be provided with one or more external device processing servers (or external device processing server groups), the external device processing service center can be connected with a plurality of external devices through a high-speed local network (see FIG. 10C), in order to manage the communication between a plurality of central processing units 120 (120.1, 120.2, . . . , 120.*m*) and a plurality of external devices. The working system 1001 as shown in FIG. 10A is particularly suitable for public places, such as airports, railway stations, hotels, restaurants, harbors, etc.

In FIG. 10B, one central processing unit 120 and a plurality of external device processing units or external device processing service centers 110 (110.1, 110.2, . . . , 110.*n*) form a working system 1002. Each external device processing unit 110 can be arranged at different places, and at each place, the central processing unit 120 can use the external device processing unit 110 at the place. In the working system 1001 as shown in FIG. 10B, after each central processing unit 120 (120.1, 120.2, . . . , 120.*m*) is started up, the central processing unit 120 (120.1, 120.2, . . . , 120.*m*) always automatically sends the external device use request (including the ID thereof) through the external device communication circuit; meanwhile, the data collector 142 sends the password information collected from the user to the external device processing unit or the external device processing service center 110 together with the external device use request. Once receiving the external device use request of the central processing unit 120 (120.1, 120.2, . . . , 120.*m*), the external device processing unit or the external device processing service center automatically enters the initial processing program, checks the password information of the user, and displays the ID of the central processing unit 120, the access right of the central processing unit 120 in the external device processing unit 110 and the external device condition of the external device processing unit 110 on a display screen after checking the password information of the user.

Figure 25:
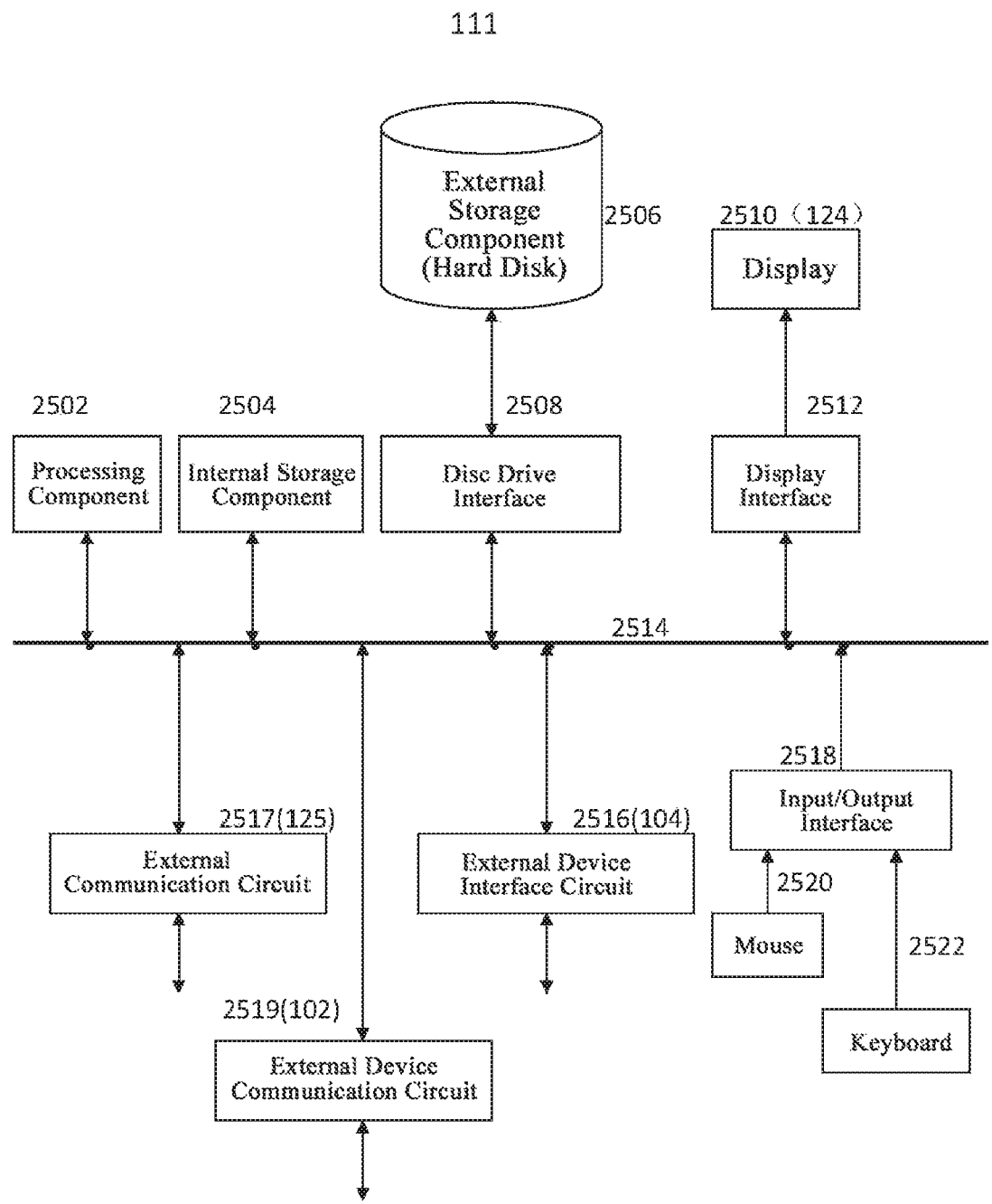
FIG. 25 is an exemplary structure of an external device server 111 in FIG. 1 or a server 1014 in FIG. 10C.
Figure 26:
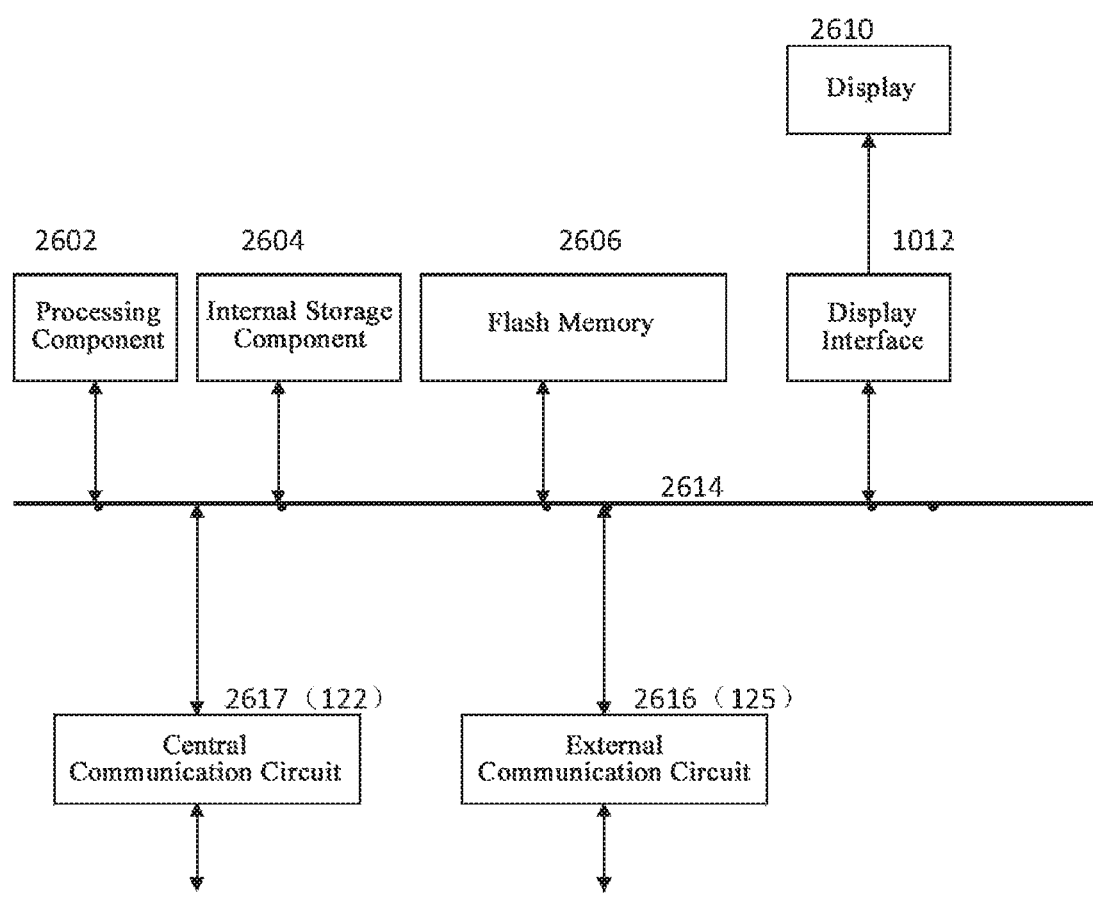
FIG. 26 is an exemplary structure of a central processor 121 in FIG. 1.

The program as shown in FIG. 11 can be stored in the memory 106 or 126 as shown in FIG. 1 and is executed by the external device processing unit 110 or the central processing unit 120. The program as shown in FIG. 11 can also be stored in a memory 2504, 2506, 2604 or 2606 as shown in FIGS. 25-26.

For the working system provided by the present invention, in the advent of a new external device or a novel external network node, the hardware of the existing central processing unit 120 does not need to be modified, and only corresponding parameters and/or commands are simply set for the new external device in the central management operating system and the program. Of course, the external device management operating system and the program and the external device interface circuit in the external device processing unit 110 need to be correspondingly updated.

Figure 12:
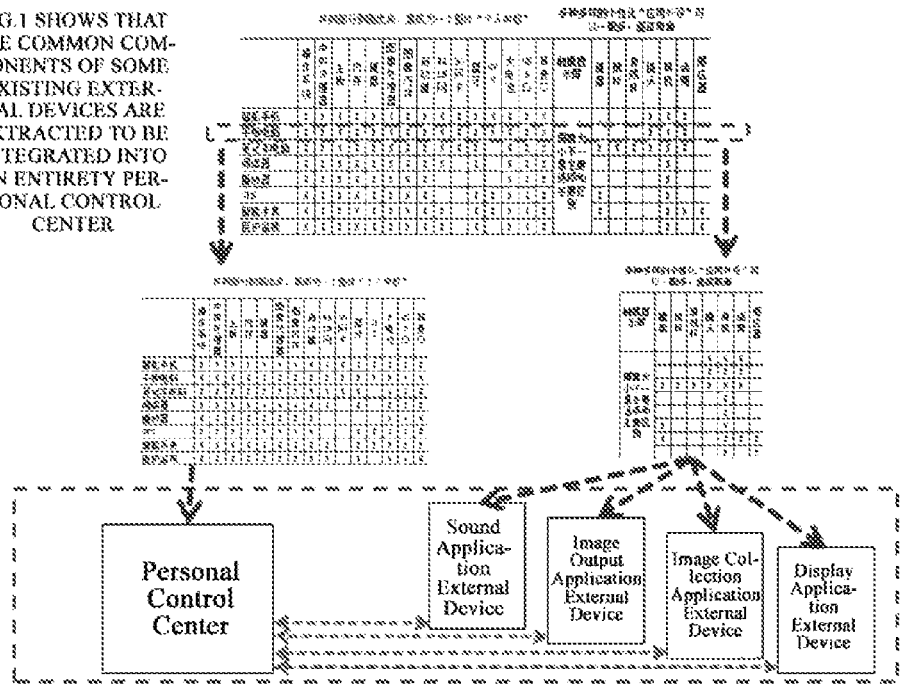
FIG. 12 is an embodiment of analyzing similar parts of common electronic devices on the market to integrate into an entire personal control center.

FIG. 12 is an embodiment of analyzing similar parts of external devices of common electronic devices on the market; FIG. 27 is a partial enlarged view of FIG. 12. According to the analysis in FIG. 12 and FIG. 27, in a use process, the central processing unit 120 in the present invention can effectively and dynamically combine the external devices 131(131.1, 131.2, . . . , 131.*n*).

Figure 13:
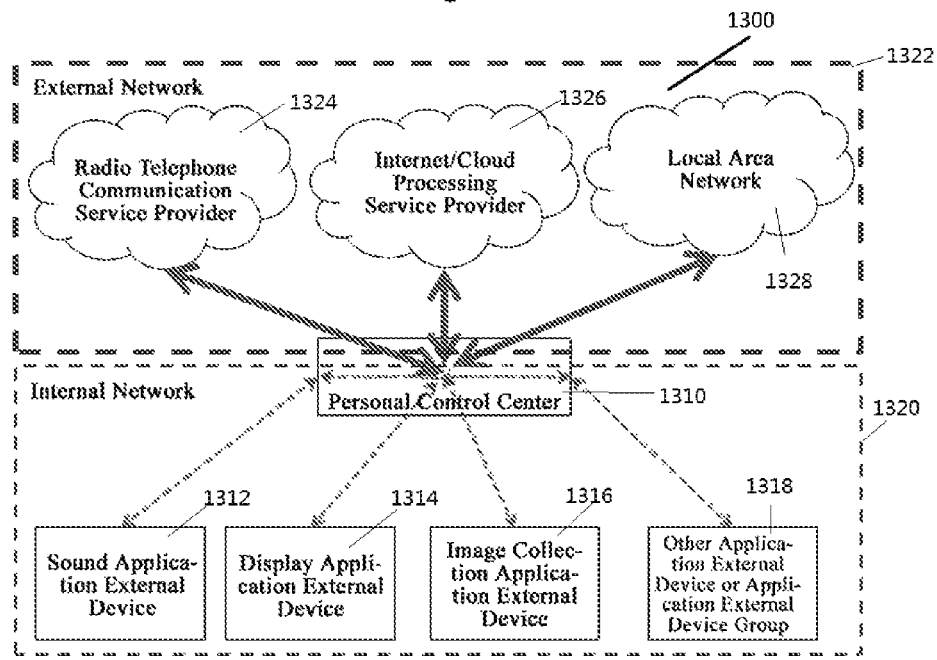
FIG. 13 is a block diagram of a personal control center, an external device and a personal working system in the present invention.

FIG. 13 shows a communication working system 1300. As shown in FIG. 13, the working system 1300 is formed by a personal control center 1310 communicating with a wireless communication and sound external device 1312, a display external device 1314, an image display external device 1316, other external devices or external device groups 1318 and one or more external devices and can complete one or more tasks. The working system as shown in FIG. 13 includes an internal network 1320 and an external network 1322. The internal network is used for performing wireless communication with the sound external device 1312, the display external device 1314, the image display external device 1316 and the other external devices or external device groups 1318; the external network 1322 is used for performing wireless communication with a radio telephone communication network 1324, an internet/cloud processing network 1326 and a local area network 1322.

FIG. 14 shows a communication working system 1400. As shown in FIG. 14, a personal control center 1402 can also be connected with a plurality of personal control centers 1402, 1406, 1408, 1410 and 1412 through an external network 1404, the internet or the local area network, and participation in a social network site or an enterprise group network is equivalent to participation in human group activity.

Figure 15:
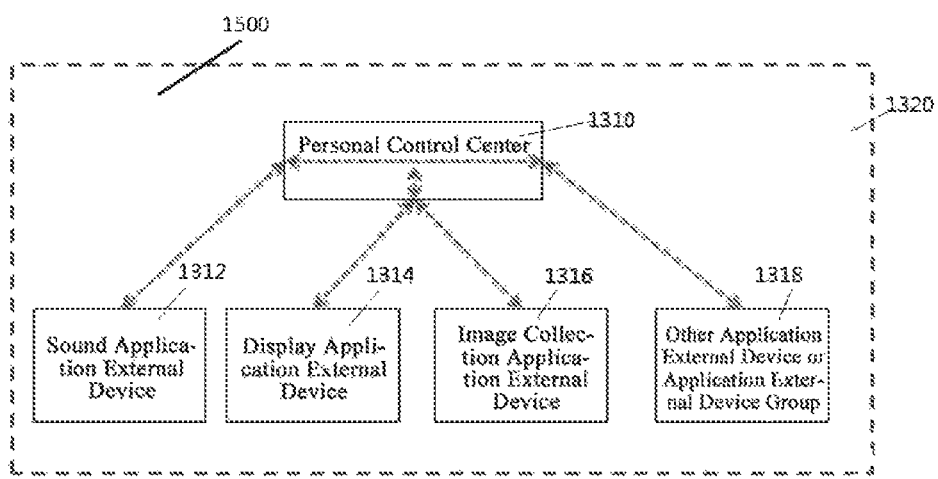
FIG. 15 is an embodiment of an internal network formed by a personal control center and an external device in the present invention.

FIG. 15 shows a communication working system 1500. As shown in FIG. 15, the internal network 1320 and the external network 1322 can work separately and independently. In the working system as shown in FIG. 15, after the external network 1322 is removed, the working system can work independently.

Figure 16:
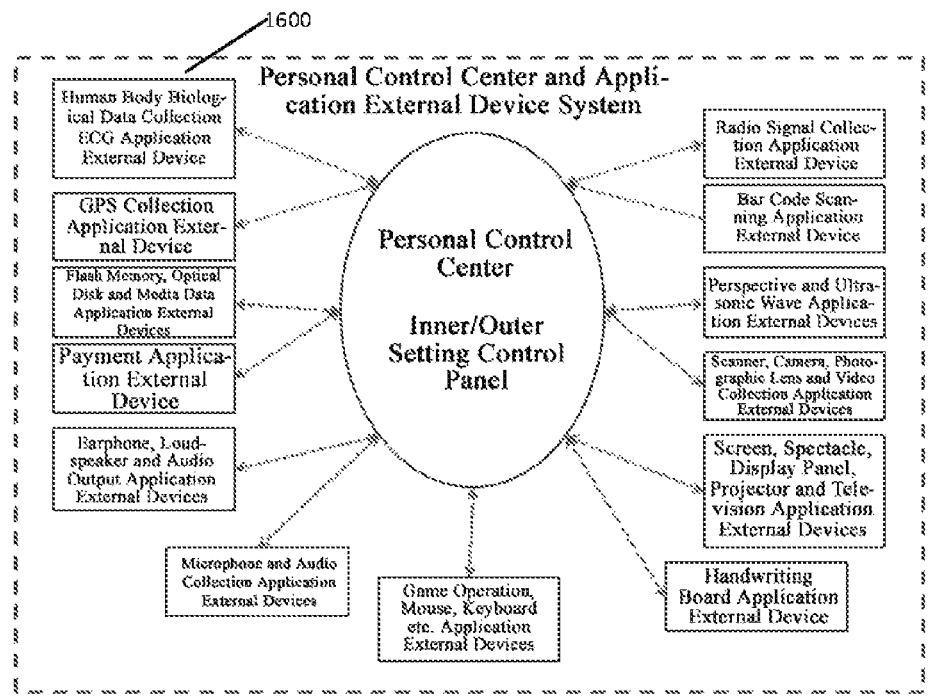
FIG. 16 is an example of an embodiment of an external device in the present invention.

FIG. 16 shows a communication working system 1600. As shown in FIG. 16, a variety of external devices included in the communication working system 1600 should be hardware devices with specific functions or applications, including a human body biological data collection ECG application external device, a GPS collection application external device, a flash memory/optical disk/media data application external device, a payment application external device, an earphone/loudspeaker/audio output application external device, a microphone/audio collection application external device, a game operation/mouse/keyboard application external device, a handwriting board application external device, a screen/spectacle/display panel/projector/television application external device, a scanner/camera/photographic lens/video collection application external device, a perspective/ultrasonic wave application external device, a bar code scanning application external device, a wireless signal collection application external device, etc.

Figure 17:
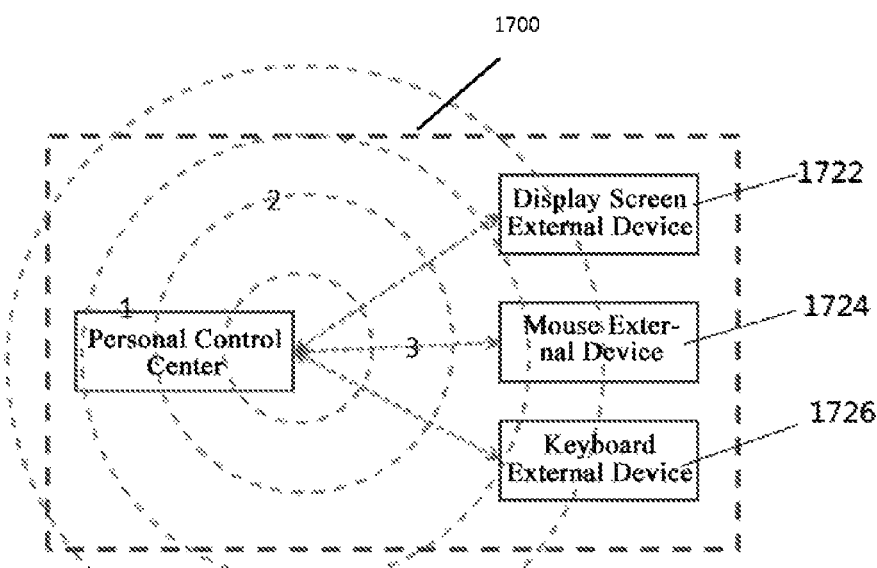
FIG. 17 is an illustration of initial setup operation of a system in the present invention.

FIG. 17 shows a communication working system 1700. As shown in FIG. 17, a personal control center 1720 receives a pairing call of an external device (a display screen external device 1722, a mouse external device 1724 and a keyboard external device 1726), after the personal control center 1720 replies to the pairing call of the external device, a guest and a host exchange verification information and are paired via verification, the personal control center will store the information of the external device successfully paired, when the external device enters in the reply range of the personal control center again, the personal control center can immediately enter the connection states of automatic verification, automatic pairing and automatic communication once being called.

As shown in FIG. 17, the initial setup can be started by wired connection or a control key fixed on the personal control center, the personal control center is preassembled with an operating system, a communication system and the driving systems of all external devices before it leaves the factory (step #1), after the personal control center is electrified, the system starts to automatically find out (step #2) a display external device and an input external device sending pairing requests, and uses preset factory passwords of the external devices to pair with the external devices sending the pairing requests and found within the search range and to set up communication (step #3). After the personal control center is paired and connected with such external devices as a display screen external device, a keyboard and a mouse and the like, a computer system is constituted, and the user can complete any individualized operation and set and modify a pairing command.

Figure 18:
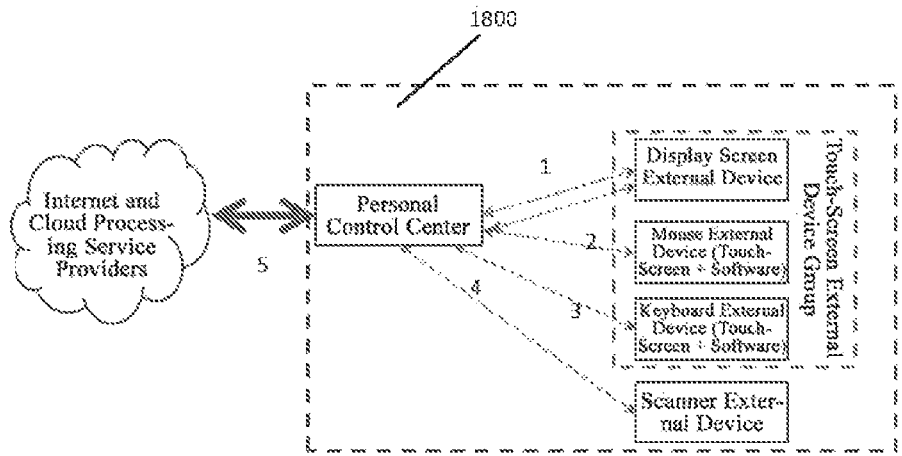
FIG. 18 is a block diagram of operation of a setup for a file in the present invention.

FIG. 18 shows a communication working system 1800, and the communication working system is illustrated below with the setup of an address book as an example: the operator firstly selects a display screen external device ① to be paired with a personal control center, and a main desktop interface of the personal control center can be displayed on the display screen after the pairing operation; selects a mouse external device ② to be paired with the personal control center and then selects the address book in the personal control center; selects a keyboard external device ③ to be paired with the personal control center and then inputs the data of the address book; or selects a scanner external device ④ to be paired with the personal control center and records the scanned data; finally, the personal control center stores the data. The personal control center is independently used under different external network communication environments. Of course, the personal control center can be connected with the external network and used in the environment supported by the external network, and the data of the address book can be further sent to a cloud processor for storage and even are shared with others.

Figure 19:
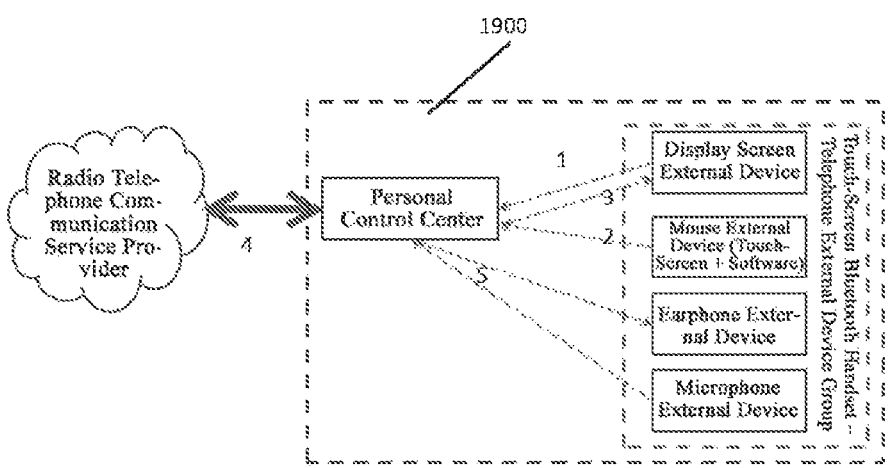
FIG. 19 is a block diagram of an embodiment of illustrating an external device group with calling as an example in the present invention.

FIG. 19 shows a communication working system 1900, which is used for the personal control center and a plurality of external devices to complete a dialing operation together. In FIG. 19, a plurality of external devices with single functions can form an external device assembly "external device group" with related functions, for example, such external devices as a keyboard, a mouse, an earphone, a microphone and a display screen and the like are combined into an entirety to form a telephone external device group with a touch keyboard, a telephone receiver and a microphone (see components in a dotted line frame) in an external device operation example. FIG. 19 illustrates that before the working system is formed, the personal control center and the external device cannot singly complete a task and must be paired and connected to form the working system to complete the task together. FIG. 19 shows an embodiment that a plurality of external devices with single functions can form the external device assembly "external device group" with the related functions, for example, the keyboard, the mouse, the earphone, the microphone and the display screen are combined into an entirety to form the telephone external device group with the touch keyboard, the telephone receiver and the microphone (see components in the dotted line frame) in the external device operation example.

Figure 20:
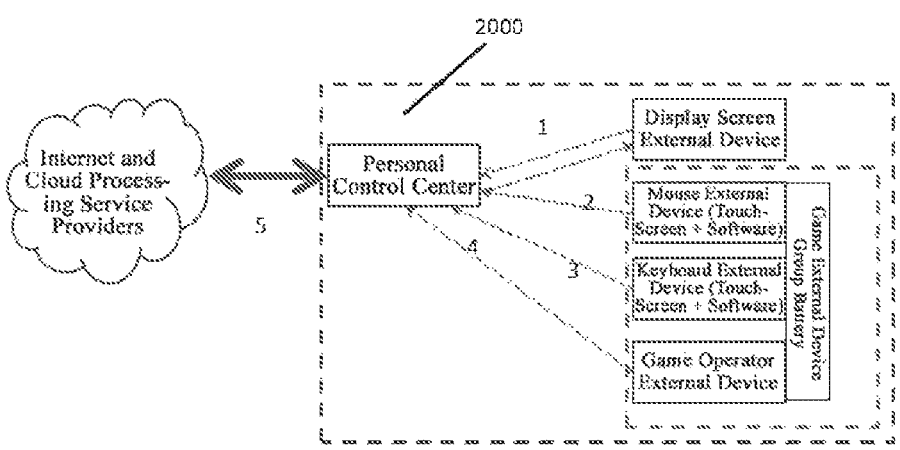
FIG. 20 is a block diagram of an embodiment of illustrating an external device group with a game machine as an example in the present invention.

FIG. 20 shows a communication working system 2000. As shown in FIG. 20, a plurality of identical external devices or external device groups can also share a battery or a renewable energy source, a touch screen+a software keyboard+a game operator+a battery form a game external device group, and the volume of the external device group is further integrated and simplified. As identical functions are shared in the "personal control center", the structure of the external device becomes simple, the weight is lightened, the cost is reduced, the power consumption is reduced and the radiation is alleviated, and the advantages of strong universality and wide applicability are better embodied, thus the external device can be only provided with a miniature battery or a renewable energy source to work for a longer time, similarly, a plurality of identical external devices or external device groups can also share a battery, a touch screen+a software keyboard+a game operator+a battery form a game external device group, and the volume of the external device is further simplified.

Figure 21:
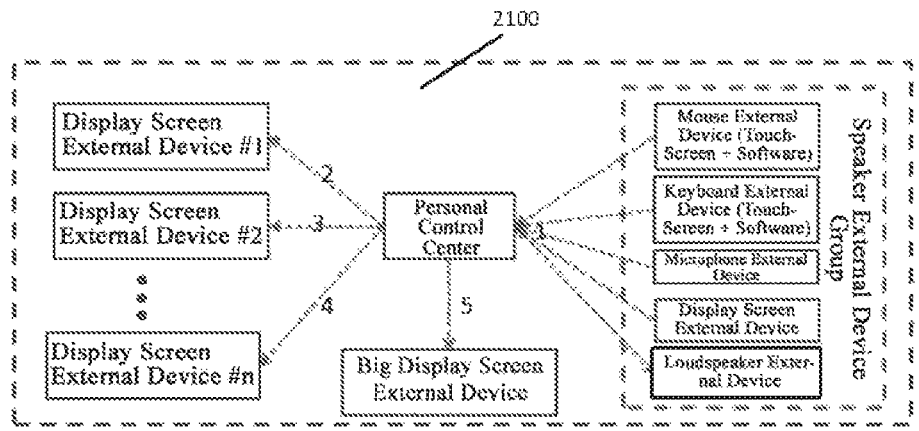
FIG. 21 is a block diagram of a "multi-split" embodiment in the present invention.

FIG. 21 shows a multi-split simultaneous connection type communication working system 2100. As shown in FIG. 21, one personal control center can be simultaneously paired with a plurality of external devices through a single channel or a plurality of channels for communication. An illustration will be given below through an application in a classroom:

1. a lecturing and teaching system: a lecturer performs calling and verification pairing @ 1 on the personal control center with a lecturer external device group in a lecture hall, wherein the personal control center is provided with a central processor, an operating system, an external device driving system, a data processor, a graph processor, a data memory (an internal memory, a hard disk) and a communication mechanism, a desktop of the personal control center of the lecturer is displayed in a lecturer display screen external device, and the lecturer operates a touch screen or a mouse external device to select the manuscript of the current lecture on the desktop of the personal control center;
2. each admission audience has a display screen external device and immediately sends a pairing request after admission, a weak frequency band signal is transmitted to the personal control center of the lecturer by a weak frequency band signal relay device in the lecture hall, the personal control center receives and identifies the identity of the audience #1 of the display external device @2 of the audience and sends a receiving signal to complete pairing to set up a data link, and the same operation @3 is repeated to pair the audience #2, and the operation @4 is repeated to pair the audience # n;
3. the lecturer prepares a large public screen for the audience having no display screen external device, and the large public screen is paired @5 with the personal control center;
4. if the lecturer is a classroom teacher, he/she can record the student display screen pairing conditions of the term in the personal control center to serve as attendance recordings. When starting to lecture, the lecturer operates the lecture document in the personal control center through the display external device, the personal control center sends image signals of display contents at weak frequency bands and the weak frequency signals are sent to the paired and verified display screen external devices on site through sensor relay. The lecturer can also issue the lecture contents on the external network (a school local area network) through the personal control center, the audience can receive strong frequency band signals through an own personal control center and send the strong frequency band signals to other display external devices paired and connected with the personal control center on the surrounding, and the relay transmission of video signals of the display contents is achieved by the transmission and relay of the external network.

Figure 22:
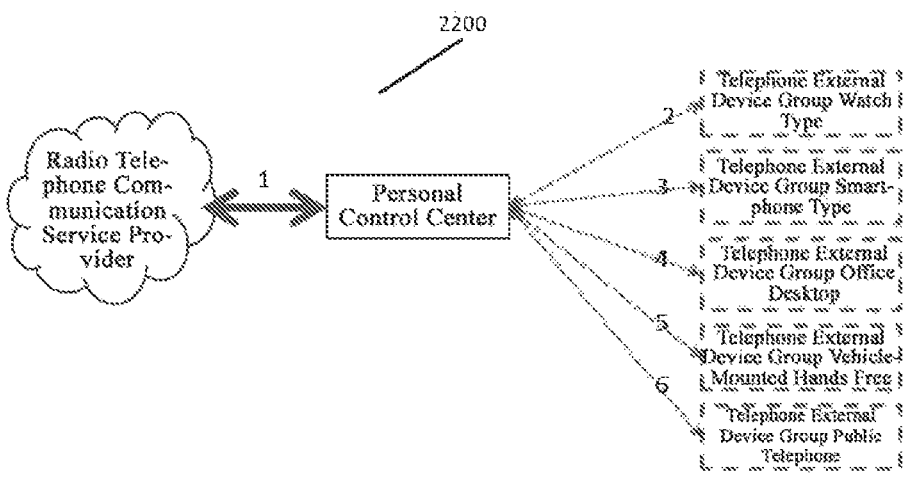
FIG. 22 is a block diagram of respective embodiments of "one-pair-with-multiples" in the present invention.

FIG. 22 shows a multi-split simultaneous connection type communication working system 2200. As shown in FIG. 22, a personal control center is respectively configured with a plurality of external devices with single functions, and an embodiment of multiple functions with a plurality of external devices demonstrates that a personal control center can use different external devices to call by using the same number in different connection manners.

1. At first, the user selects a telephone company providing a calling service to pair with the personal control center or buys a telephone number or pays a telephone bill @1;
2. a telephone external device group is composed of such external devices as a screen+a mouse+an earphone+a microphone+a battery+a pairing and verifying external device; the telephone external device group can be in a variety of combined manners, for example, such external devices as a "watch external device", a "mobile phone external device", a "desk desktop external device", a "vehicle-mounted hands free external device", a "living room TV", "bedroom projection" and the like, and even the "telephone" in a public telephone station is merely a telephone external device group. All the calls are dialed by the same telephone number of the personal control center, the user does not need to carry a variety of styles of telephone sets, but can select or take up any nearby telephone external device and select a calling object from an own telephone directory or call record after simple pairing and connecting to start calling in the most convenient manner.

Figure 23:
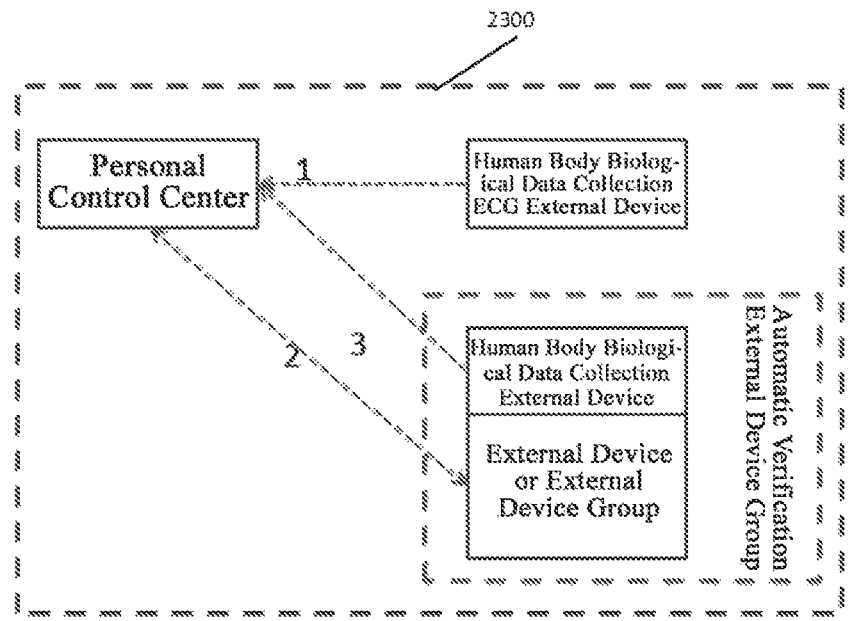
FIG. 23 is a block diagram of an embodiment of biological password identification in the present invention.

FIG. 23 shows a communication working system 2300. As shown in FIG. 1423, a quick, highly safe and reliable combination of external device pairing and authentication and identification is set up in an application. At first, a human body biological data collection external device is paired with the personal control center of an owner to collect the biological data of the owner, for example such biological information as heartbeat frequency, blood oxygen content, electrocardiogram wave form ECG and fingerprint of the owner and the like, and the biological data of the owner is analyzed and recorded to form the biological fingerprint of the owner; when an operator (owner) holds/touches another external device with a built-in human body biological data collection ECG external device, the human body biological data of the operator can be collected and transmitted into the personal control center, the personal control center analyzes the detected data, compares the detected data with the stored biological fingerprint, and can even compare the detected data with real-time data, and the personal control center can automatically accept the request of the external device after confirmation of conformity. This set of hardware can form a set of (external device+human body biological data collection external device+battery) automatic pairing safe external device group. This function can be applied to such fields as online payment, safe sign in, etc. A personal control center user can immediately use an external device once taking up the same and can even continue to read a novel and watch a program from a halted place. For the demand of a higher level confidentiality of information, the authenticity of the user needs to be usually verified in the fields of finance, security and national defense, at this time, a human body information collection external device closely matched with the personal control center can collect the electrocardiogram information of a sanyinjiao acupuncture point of an ankle of the user, because the human body data size of the sanyinjiao is larger, more accurate and more secret than the data sizes of other positions, and the collection device external device is more convenient to wear. When the user touches the function external device needing to be matched by a hand, the function external device can collect the human body information of the user through the touched skin of the user and compare the human body information with the real-time data collected by the personal control center, so as to decisively and accurately judge whether the toucher and the personal control center carrier are the same person to achieve a higher level of identification and authentication.

Figure 24:
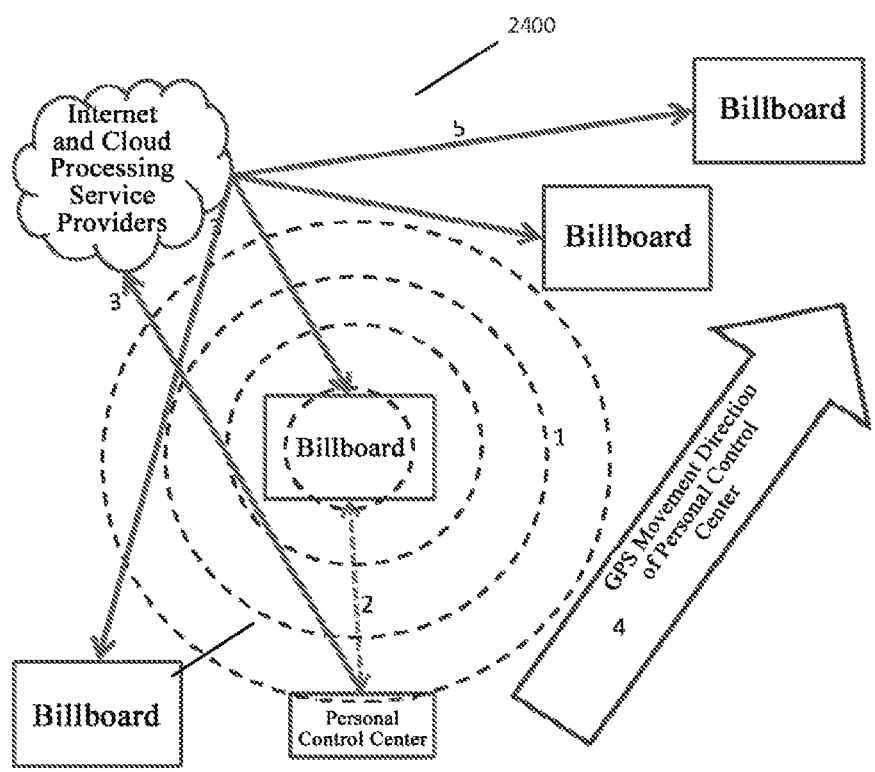
FIG. 24 is a block diagram of an embodiment that a third party utilizes the information of a personal control center in the present invention.

FIG. 24 shows a communication working system 2400, which is used for forming a more human-friendly and more targeted advertisement system. For example, an advertiser can reach an information sharing agreement with the user of the personal control center, such external devices as a roadside billboard or a carriage billboard continuously send a pairing request #1 containing a billboard address, after receiving a reply #2 signal of the pairing call of the billboard, the personal control center reaching the information sharing agreement immediately automatically sends related information regulated in the #3 information sharing agreement through a weak frequency band or sends the same through the internet to a billboard built-in system, the billboard built-in system analyzes and calculates to select the advertisement better catering to target people and with stronger pertinence, and the billboard built-in system can also judge the movement route direction #4 of the target people in combination with GPS information data to continuously play #5 on the way.

FIG. 25 shows an exemplary structure of the external device server 111 in the external device processing unit 110 in FIG. 1 and FIGS. 3-9 or a server (for example 1014) in FIG. 10C (or an external device processing service center 110'). As shown in FIG. 25, the external device server 111 (or the server 1014 in FIG. 10C) includes a processing component 2502, an internal storage component 2504, an external storage component (hard disk) 2506, a disc drive interface 2508, a display 2510 (or 124), a display interface 2512, an external device communication circuit 2517 (or 102), an external device interface circuit 2516 (104), an external communication circuit 2519 (125), an input/output interface 2518, a mouse 2520, a keyboard 2522 and a group of system buses 2514.

The external storage component (hard disk) 2506 is connected with the disc drive interface 2508; the display 2510 is connected with the display interface 2512; the mouse 2520 and the keyboard 2522 are connected with the input/output interface 2518. The processing component 2502, the internal storage component 2504, the disc drive interface 2508, the display interface 2512, the external device communication circuit 2517 (or 102), the external device interface circuit 2516 (104), the external communication circuit 2519 (125) and the input/output interface 2518 are connected with the system buses 2514. The internal storage component 2504 and the external storage component 2506 can store programs, instructions and data. In general, the internal storage component 2504 has a faster access speed, while the external storage component 2506 has larger storage capacity. The display 2510 can provide a visible interface between the program being executed and the user. The external device communication circuit 2517 (or 102) is used for communicating with the central processing unit 120, the external device interface circuit 2516 (104) is used for communicating with application external devices (131.1, 131.2, . . . , 131.$n$), and the external communication circuit 2519 (125) is used for communicating with the external network node. The processing component 2502 can read the programs, instructions and data in the internal storage component 2504 and the external storage component 2506 and can control the operation of the server by executing these programs and instructions.

FIG. 26 shows an exemplary structure of the central processor 121 of the central processing unit 120 in FIG. 1 and FIGS. 3-9. As shown in FIG. 26, the central processor 121 includes a processing component 2602, an internal storage component 2604, a flash memory (Flash Memory) 2606, a display 2610, a display interface 2612, an external communication circuit 2616 (or 125), a central communication circuit 2617 (122) and a group of system buses 2614.

The display 2610 is connected with the display interface 2612. The processing component 2602, the internal storage component 2604, the flash memory (Flash Memory) 2606, the display interface 2612, the external communication circuit 2616 (or 125) and the central communication circuit 2617 (122) are connected with the system buses 2614. The internal storage component 2604 and the flash memory (Flash Memory) 2606 can store programs, instructions and data. In general, the internal storage component 2604 has a faster access speed, while the flash memory (Flash Memory) 2606 has larger storage capacity. The display 2610 can provide a visible interface between the program being executed and the user. The central communication circuit 2617 (122) is used for communicating with the external device processing unit 110 (or the external device processing service center 110'), and the external communication circuit 2616 (or 125) is used for communicating with external network node. The processing component 2602 can read the programs, instructions and data in the internal storage component 2604 and the flash memory (Flash Memory) 2606 and can control the operation of the server by executing these programs and instructions.

The program (or flow) as shown in FIG. 11 can be stored in the internal storage component 2504 or the external storage component (hard disk) 2506 and can be executed by the processing component 2502. The program (or flow) as shown in FIG. 11 can also be stored in the internal storage component 2604 or the flash memory (Flash Memory) 2606 and can be executed by the processing component 2602. The program (or flow) as shown in FIG. 11 can be executed for multiple times (namely, executed by multiple users) in parallel (or at the same time), in order to respond to the invocation (or the invocation of multiple users) of a plurality of central processing units 120 (120.1, 120.2, . . . , 120.$m$).

It should be noted that, according to the principle of the present invention, the personal control center in FIGS. 13-24 can also communicate with the external device through the external device processing unit 110 or the external device processing service center 110' as shown in FIG. 1 and FIG. 10A.

The external device communication circuit 102, the external device interface circuit 104, the central communication circuit 122, the external communication circuit 125 and the external communication circuit 1016 (125) in FIG. 1 can be existing circuits, particularly, the interface circuit of each external device is an existing circuit, and the communication circuits with various types of external network nodes are existing circuits. Therefore, no detailed description is given on these circuits or lines.

The main functions and features of the functional units in the working system provided by the present invention will be further illustrated below.

1. The Central Processing Unit

The central processing unit in the communication working system provided by the present invention has the major or all computing and thinking abilities in the system. For example, the central processing unit can include one or more of the following main functional modules and features:

functions and functional modules: a central processor, an operating system, driving systems of all external devices, a data processor, a graph processor, a data memory (an internal memory, a hard disk), a communication center, a network card, a phone card, a router, a radio receiving and transmitting device, a cooling device, and except the mechanisms used for completing the initial setup and in wired connection, for example, a switch, a control key or a display screen or the like, other operation hardware or external devices does not need to be fixed. The outline of the central processing unit can be a black box of a control functional module or a combination of a plurality of control functional modules;

the central processing unit has two or more wireless communication modes of a strong frequency band and a weak frequency band, and a wired manner or the wireless signal of an indoor local area network of a medium-strength frequency band (30 meters) can also serve as a universal communication mode of the internal network and the external network;

the wireless connection manner of the weak frequency band aims at a limited range, for example, a range smaller than 5 meters, the wireless communication manner for identifying, excluding, verifying, pairing, driving, controlling and transmitting data of the external device may be such manners, for example, Bluetooth, RF, infrared communication (IRDA), HomeRF IEEE802.15.4 protocol, and the like;

the wireless connection manner of the strong frequency band aims at a wide range, and is to exchange data with other wireless communication systems or wireless communication service providers, for example, to exchange data with the external network through communication protocols and manners, such as a cellular network (Cellular Network), a 3G, 4G, or nG phone card, a wireless network card, a wireless local area network (WLAN) and a WI-FI router, satellite signal, laser communication, quantum communication and the like;

the central processing unit is used as a cache, an encipher and a decoder located between a user and a "cloud" processing; some personal regional information or confidential information can be stored in the central processing unit without being dispersed or transmitted outwards;

the central processing unit can be simultaneously paired with one or more external devices or external device groups for communication, but each external device or external device group can only communicate with the same central processing unit at the same time;

the central processing unit receives the pairing call of the external device through wired connection and/or wireless connection, after the central processing unit replies to the pairing call of the external device, a guest and a host exchange verification information and are paired via verification, then the personal control center will store the information of the successfully paired external device, when the external device enters the reply range of the central processing unit again, the central processing unit can immediately enter the connection states (as shown in FIG. 17) of automatic verification, automatic pairing and automatic communication once being called; some special or confidential external devices should also have exclusiveness and disconnect and remove the function requirements of previous link information;

the central processing unit exchanges data with the external device or the external device group in the system in a wireless connection manner or a wired connection manner of the weak frequency band, and the low frequency band manner can provide necessary data exchange and generate less power consumption.

the central processing unit contacts with a network beyond the system in the wireless connection manner or the wired connection manner of the strong frequency band to achieve maximum distance and power, which cannot be achieved by low frequency band signals;

besides being provided with a wired electric energy interface, the central processing unit is further provided with a replaceable, chargeable and high-capacity battery or a renewable energy source, in order to satisfy the energy consumption of operation and internal and external communication and contact of the control center;

the central processing unit can also obtain the human body biological data of the owner, for example, such data as blood oxygen content, pulse rate, electrocardiogram and the like, through the external device contacting with the skin for user identification, authorization and authentication;

the independent central processing unit is more conducive to updating and upgrading hardware, and it becomes easier to centralize all the resources and costs to configure the strongest central processing unit;

the central processing unit can be a node from a final data use or collection terminal device to the internet and a cloud database; the communication modes are divided into two groups with different distances by the central processing unit, thereby solving such problems of the terminal devices as high energy consumption, high radiation, complicated circuit structure, difficulty in heat dissipation and the like;

the central processing unit can be carried on or placed at any nearby place, for example, the central processing unit can be put in a school bag, a hand bag and a pocket and can also be hanged on a belt;

the connection of the data and the external network in the central processing unit always follows the user, and the input and output tool is an external device, which can be fetched and used by the user.

2. The External Device and the External Device Processing Unit

The external device in the communication working system provided by the present invention has a certain function and has the capability of executing a certain instruction task, but has no thinking ability. The external device transmits the collected information to the central processing unit, the central processing unit calculates and then sends a command to the corresponding external device to execute the command, and a data collection external device and a result execution external device can be the same external device or different single external devices and even a plurality of external devices. The external device is a hardware device (the embodiment of the external device as shown in FIG. 5) designed according to specific application. For example, the external device can have one or more of the following structures and features:

the external device with a data collection or data output function transmits the collected data to the central processing unit through the wireless connection manner or the wired connection manner of the weak frequency band;

the external device in wireless connection must be provided with a battery or a renewable energy source for providing electric energy that the external device needs, and a plurality of external devices combined together can share the same power supply;

the external device in wireless connection must be provided with the functions of wireless signal receiving and transmitting, driving program storage and signal processing;

the external device with functions of input and execution accepts and executes the data and instructions transmitted by the central processing unit through the wireless connection manner or the wired connection manner of the weak frequency band;

the external devices do not directly communicate with each other, but merely contact with the center, send data to the central processing unit and accept the instructions sent by the central processing unit;

the wireless connection manner of the weak frequency band aims at a limited range, for example, a range smaller than 5 meters, the wireless communication manner for identifying, excluding, verifying, pairing, driving, controlling and transmitting data of the external device may be such manners, for example, Bluetooth, RF, infrared communication (IRDA), HomeRF IEEE802.15.4 protocol, and the like;

a variety of external devices must have certain functions, for example, a keyboard, a mouse, an earphone, a microphone, a display screen and the like (the embodiment of the external device as shown in FIG. 5);

the functions of the external devices can be repeated, one central processing unit can be paired with a plurality of display screens served as the external devices, so that the plurality of display screens display the information sent by the same central processing unit at the same time;

a plurality of external devices with single functions can form an external device assembly "external device group" with related functions, for example, such external devices as a keyboard, a mouse, an earphone, a microphone and a display screen and the like are combined into an entirety to form a telephone external device group with a touch keyboard, a telephone receiver and a microphone (see components in a dotted line frame as shown in FIG. 19) in an external device operation example (as shown in FIG. 19);

each external device can only be paired with one central processing unit at the same time for communication, and each central processing unit can be simultaneously paired with a plurality of external devices for communication;

the external device is started to call the central processing unit, after the central processing unit replies, the guest and the host exchange verification information, the pairing is successful after the verification is passed, then the central processing unit stores the information of the successfully paired external device, when the external device enters the range of the central processing unit again, the central processing unit can achieve automatic verification, automatic pairing and automatic communication; (as shown in FIG. 6), to reinforce the feasibility and the flexibility of the formed working system, each external device in the present invention includes an interface and a circuit, which are used for sending a connecting request and a device parameter to a central control unit; the central control unit replies to the connecting request and the device parameter sent by the external device and connects each external device according to the connecting request and the device parameter. The central control unit further includes a circuit and a program for enabling the connected external device to be compatible for use;

after being verified and paired within the low frequency band of a certain central processing unit, any external device or external device group can be paired with the central processing unit and can be invoked by the central processing unit after being paired, and the external device or the external device group can provide services when a user achieves and stop providing services when the user leaves for the central processing unit; some special or confidential external devices should also have exclusiveness and disconnect and remove the function requirements of previous link information;

each external device can be provided with a respective external device processing unit and form a working system with a central processing unit;

a plurality of external devices can be provided with an integrated external device processing unit and form the working system with the central processing unit; the integrated external device processing unit can be expanded and form communication connection with a new external device;

because identical functions are shared in the "central processing unit", the structure of the external device becomes simple, the weight is lightened, the cost is reduced, the power consumption is reduced and the radiation is alleviated, and the advantages of strong universality and wide applicability are better embodied, thus the external device can be only provided with a miniature battery or a renewable energy source to work for a longer time, similarly, a plurality of identical external devices or external device groups can also share a battery (see FIG. 20), a touch screen+a software keyboard+a game operator+a battery form a game external device group, and the volume of the external device is further compacted;

the external device can be universalized to become the external device of any one, each personal terminal can operate a certain external device, and the user can use any screen to watch programs or read books and can also borrow the external device to other users for reading.

3. The Communication Mode of the Central Processing Unit and the External Device System The central processing unit and the external device system can communicate in a variety of communication manners. For example, the central processing unit adopts two wireless communication manners of a strong frequency band and a weak frequency band; a wired manner or the wireless signal of an indoor local area network of a medium-strength frequency band (30 meters) can also be used as a universal communication mode of the internal network and the external network. In a preferable embodiment of the present invention, the central processing unit adopts the strong frequency band communication mode on the external network and adopts the weak frequency band communication mode on the internal network (see FIG. 13).

The wireless connection manner of the weak frequency band (a solid arrow in FIG. 13) aims at a limited range, for example, a range smaller than 5 meters, the wireless communication manner for driving, controlling, verifying, pairing, and transmitting data of the external device may be such manners, for example, Bluetooth, RF, infrared communication (IRDA), HomeRF IEEE802.15.4 protocol, and the like, and exchanging data with the external devices within the range exchange data in a low energy consumption communication protocol and manner within a close distance range;

the wireless connection manner of the strong frequency band (a dotted arrow in FIG. 13) is used for enabling the central processing unit to exchange data with other wireless communication systems or the systems that the wireless communication service providers provide within a wide range, for example, exchanging data with the external network through such communication protocols and manners as a cellular network (Cellular Network), a 3G, 4G, or nG phone card, a wireless network card, a wireless local area network (WLAN) and a WI-FI router, satellite signal, laser communication, quantum communication and the like.

The present invention further has the following advantages:

the triune (the central processing unit+the external device processing unit+a plurality of external devices) structure can be dynamically combined, adjusted, upgraded and updated to ensure the stability of the system to the maximum.

Due to the simplified and centralized functions, the central processing unit is minimized, more convenient to carry, capable of saving more energy and more environment-friendly and economical.

A plurality of external devices are freely combined according to demand, so that the selection of the external devices is diversified and the utilization rate of the external devices is improved.

Each "central processing unit" is relatively fixed, can only occupy one IP address, one telephone number and one device ID, can be integrated with a human body life signal collector, can completely serve as the personal identity identification ID of the owner and can be cooperatively used with large data and cloud processing and the like more effectively.

A dynamic exclusive local area network is convenient to construct, in order to isolate the internet, flexibly form a closed local area network, isolate external contact and facilitate network security control and anti-terrorism security demand; similarly, an external device accessing to the internet is flexibly added to immediately form an open local area network.

Hardware devices are flexible to access, the device structure is simplified, the manufacturing cost is reduced, the universality is greatly improved and the security management is convenient. Taking the existing logistical barcode scanner as an example, the logistical barcode scanner is an entire computer, such that the manufacturing cost is high, and a large amount of data are stored to cause security burden; by adopting the system, the structure of the logistical barcode scanner is greatly simplified, the manufacturing cost is reduced, the risk caused by data loss is basically zero, data can be recorded by arbitrary borrowing of the scanning external device, and synchronous data do not need to be awaited when the barcode scanner is replaced.

In such areas as airports, train stations, cruise ships, large enterprises, schools, hospitals, libraries and the like, an external device control system can be connected with such external devices as an official device, a test device, a data collection device, a display device, a printing device and the like, which the different working and application environments need, in order to construct a dynamic service center, which is high in efficiency, low in cost and convenient to update and upgrade, for providing individual support for central processing units entering the areas and needing to use related devices. Taking the airport as an example, when a central processing unit (120) enters the area provided with an external device control system (110') in advance, the central processing unit (120) can inquire the position of the necessary external device, whether the external device is available and how long it needs to wait and the like, if the external device is departed or automatically disconnected after being used, the external device can be immediately inquired, identified and used by other central processing units (120), thereby greatly improving the utilization rate and convenience of the external device.

The external device is integrated with an external device control unit (110) or the external device control system (110') to form a more flexible and reliable shared external device. Taking the most common television at home as an example, displays with various sizes, television receivers and the like constitute an external device system and even can be cured to an all-in-one machine, and then one central processing unit (120) can continuously read the same book, enjoy the same photograph album and watch the same film on a display of any size.

Similarly, one memory can be used as the external device to be integrated with the external device control unit (110) or the external device control system (110'), and the memory (hard disk) can provide and store data for any identifiable central processing unit (120).

The invention claimed is:

1. A working system, comprising:
a central processing unit which comprises a central processor for data processing and an internal communication circuit that is coupled to the central processor;
an external device processing unit comprises an external device processor for controlling one or more external application peripheral devices and a peripheral communication circuit;
wherein the internal communication circuit wirelessly communicates with the peripheral communication circuit;
wherein the external device processing unit is connected to a plurality of application peripheral devices to seize at least one of the plurality of the application peripheral devices for a period of time for the central processing unit,
wherein a predetermined identification is assigned to each of the central processing unit and the external device processing unit,
wherein the external device processing unit groups a plurality of application peripheral devices for the central processing unit to perform at least one particular application task,
wherein the group of the plurality of application peripheral devices is assigned with a predetermined group identification so that the at least one particular application task is performed by the central processing unit with the predetermined group identification,
wherein the group of the plurality of application peripheral devices is dynamically determined depending on the at least one particular application task,
wherein the external device processing unit receives a request from the central processing unit, the request including the predetermined identification of the central processing unit, and the external device processing unit identifies whether the central processing unit is allowed to access the external device processing unit,
wherein the external device processing unit stores and utilizes a state tracking table to dynamically group the plurality of application peripheral devices for the central processing unit, the state tracking table includes information of:
the group of the plurality of application peripheral devices;
the predetermined group identification assigned to the group;
the predetermined identification assigned to each of the central processing unit and the external device processing unit; and
a current use state of the group of the plurality of application peripheral devices, the use state set to one of an idle state, a lock state and a working state, wherein, in response to the request, the external device processing unit updates the state tracking table to modify the current use state of the group of the plurality of application peripheral devices from the idle state to the lock state and sends a request approval reply to the central processing unit, the request approval reply including the predetermined identification of the central processing unit, the predetermined identification of the external processing unit, and the predetermined group identification, wherein, in response to the request approval reply, the central processing unit transmits an external device starting request to the external device processing unit, the external device starting request including the predetermined identification of the central processing unit, the predetermined identification of the external processing unit, and the predetermined group identification, wherein, upon receiving the external device starting request, the external device processing unit updates the state tracking table to modify the current use state of the group of the plurality of application peripheral devices from the lock state to the working state, wherein, when the external device processing unit receives an external device use ending request from the central processing unit, the external device processing unit removes the predetermined identifier of the central processing unit from the corresponding row in the state tracking table and changes the use state of the group of the plurality of application peripheral devices from the working state to the idle state.

2. The system of claim 1, wherein:
the external device processing unit releases the seized application peripheral devices after finishing use so that other users can use the application peripheral devices that are occupied for the control central processing unit, and no other users can use the application peripheral devices that are seized for the central processing unit until the application peripheral devices are released.

3. The system of claim 1, wherein:
the central processing unit sends to the external device processing unit a request which includes a starting signal, an ending signal and request content that is located between the starting signal and the ending signal;
the external device processing unit sends to the central processing unit a response which includes a starting signal, an ending signal and responding content that is located between the starting signal and the ending signal.

4. The system of claim 3, wherein:
the request includes a user identification (ID) for the central processing unit;
the response includes a response ID for the external device processing unit.

5. The system of claim 1, wherein:
one of the plurality of application peripheral devices is configured to be paired with a plurality of central processing units for use at different times, but at one time, the same application peripheral device is configured to be paired only with one central processing unit.

6. The system of claim 1, wherein:
the central processing unit is paired with at least one of the plurality of the application peripheral devices through the external device processing unit before the central processing unit can use the at least one of the plurality of the application peripheral devices.

7. The system of claim 6, wherein:
the central processing unit periodically sends a request signal to the external device processing unit to request for keeping a communication connection; and
the external device processing unit periodically checks the request signal sent by the central processing unit to keep the communication connection with the central processing unit.

* * * * *